United States Patent
Dewhurst

(10) Patent No.: US 10,565,898 B2
(45) Date of Patent: Feb. 18, 2020

(54) SYSTEM FOR PRESENTING ITEMS

(71) Applicant: David Charles Dewhurst, Hook (GB)

(72) Inventor: David Charles Dewhurst, Hook (GB)

( * ) Notice: Subject to any disclaimer, the term of this patent is extended or adjusted under 35 U.S.C. 154(b) by 262 days.

(21) Appl. No.: 15/627,254

(22) Filed: Jun. 19, 2017

(65) Prior Publication Data
US 2017/0365188 A1   Dec. 21, 2017

(30) Foreign Application Priority Data

Jun. 19, 2016  (GB) .................................. 1610676.7
Oct. 6, 2016   (GB) .................................. 1617017.7

(51) Int. Cl.
*G09G 3/02*  (2006.01)
*G09B 21/00* (2006.01)

(52) U.S. Cl.
CPC .................................. *G09B 21/007* (2013.01)

(58) Field of Classification Search
None
See application file for complete search history.

(56) References Cited

U.S. PATENT DOCUMENTS

| | | |
|---|---|---|
| 1,350,954 A | 8/1920 | Barr |
| 1,352,940 A | 9/1920 | Brown |
| 3,007,259 A | 11/1961 | Abma et al. |
| 3,800,082 A | 3/1974 | Fish |
| 4,658,427 A | 4/1987 | Aubin |
| 5,097,326 A * | 3/1992 | Meijer ................. G09B 21/006 348/62 |
| 5,461,399 A * | 10/1995 | Cragun ................... G06F 3/011 340/4.13 |
| 5,588,839 A * | 12/1996 | Shimoda ................ G06F 3/011 434/114 |
| 6,963,656 B1 | 11/2005 | Persaud et al. |

(Continued)

OTHER PUBLICATIONS

Fournier D'Albe, E. E. "The Moon-Element", D.Appleton and Company, New York, 1924. (Chapter 8 describes completed first optophone.).

(Continued)

*Primary Examiner* — Sunit Pandya

(57) ABSTRACT

One embodiment of a system for presenting audio and tactile representations of visual and non-visual items includes obtaining (1) items, acquiring (2) a primary item and acquiring (3) secondary items according to criteria, and processing (4) the acquired items into the form of categorically-perceived audio and/or tactile effects (for example speech sounds), the primary and secondary items being distinguishable via categorically-distinct effects such as echo, reverberation, voice character, tactile effects, and stereophonic and/or tactile location. The resultant effects are typically presented (6) to an auditory and/or tactile display, allowing people can have their focus of attention directed to primary items, and simultaneously be made aware of secondary items. The magnitude of the effects can relate to the values of certain properties of the items (5). Facilities are provided for presenting and navigating multi-level representations of visual scenes and non-visual entities, interfacing to other systems, and interpreting entities from different viewpoints. Other embodiments are described and shown.

20 Claims, 7 Drawing Sheets

(56) References Cited

U.S. PATENT DOCUMENTS

| | | | | |
|---|---|---|---|---|
| 8,239,032 B2* | 8/2012 | Dewhurst | ............ | G09B 21/007 |
| | | | | 382/114 |
| 9,304,588 B2* | 4/2016 | Aldossary | ............... | G06F 3/016 |
| 9,430,954 B1* | 8/2016 | Dewhurst | ............ | G09B 21/007 |
| 9,576,460 B2* | 2/2017 | Dayal | ................... | G08B 21/02 |
| 10,191,979 B2* | 1/2019 | Summers, II | ........... | G06F 16/26 |
| 2005/0106536 A1* | 5/2005 | Liebermann | ......... | G09B 21/009 |
| | | | | 434/112 |
| 2006/0287862 A1* | 12/2006 | Levin | ...................... | G10L 13/00 |
| | | | | 704/271 |

OTHER PUBLICATIONS

Pun, T. et al. "Image and Video Processing for Visually Handicapped People" in EURASIP Journal on Image and Video Processing, vol. 2007, Article ID 25214, 2007. (Summary of the field.).

Edwards, A. "Auditory Display in Assistive Technology" in The Sonification Handbook, T. Hermann, A. Hunt, J.G Neuhoff (Eds.) 2011, pp. 431-453. (Summary of the field.).

Roth, P. et al. "An audio-haptic tool for non-visual image representation" in Proceedings of the Sixth International Symposium on Signal Processing and its Applications 2001 (Cat.No. 01EX467) : 64-7.

Jaiswal, S.R. et al. "Fusion Methodology to Sonification of Color Images" in World Research Journal of Pattern Recognition ISSN: 2278-8557 & E-ISSN: 2278-8565, vol. 1, Issue 1, 2012 (Includes description of GATE project—Graphics Accessible to Everyone—and a method of sonification combining sound and speech.).

Dewhurst, D.C. (present applicant) "Using "Imprints" to Summarise Accessible Images" in Proc. of ISon 2013, 4th Interactive Sonification Workshop, Fraunhofer IIS, Erlangen, Germany, 2013 (Present applicant's system prior to inclusion of "Focus effects" and other features.).

Brock, D. et al. "Word Spotting in a Multichannel Virtual Auditory Display At Normal and Accelerated Rates of Speech" in Proc. of 18th International Conference on Auditory Display (ICAD), Canberra, Australia, 2016.

W3C OWL Working Group "OWL 2 Web Ontology Language Document Overview (Second Edition)", https://www.w3.org/TR/owl-overview/, 2012.

* cited by examiner

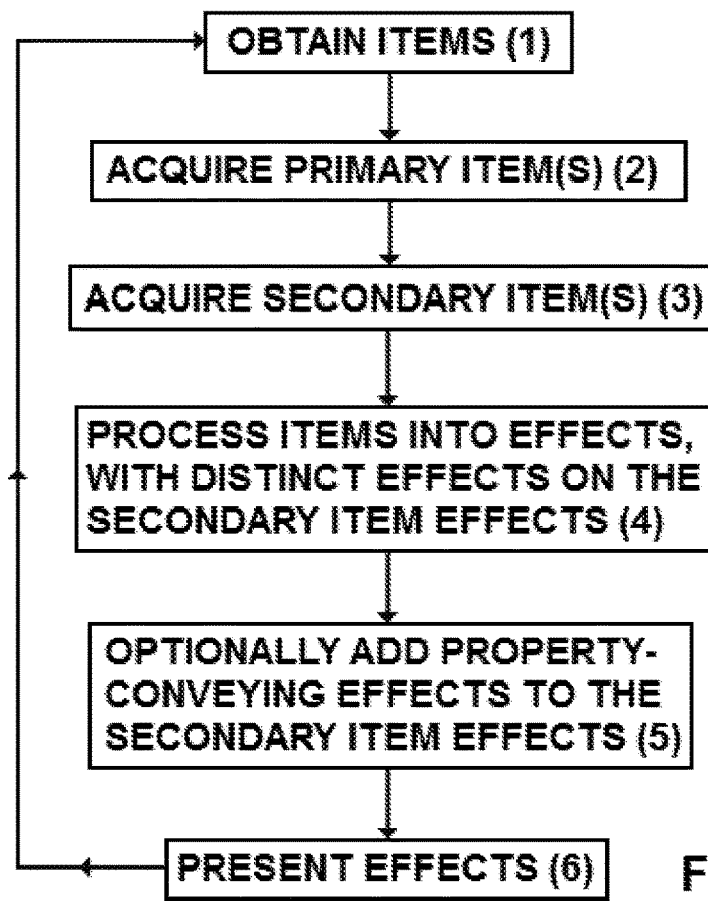
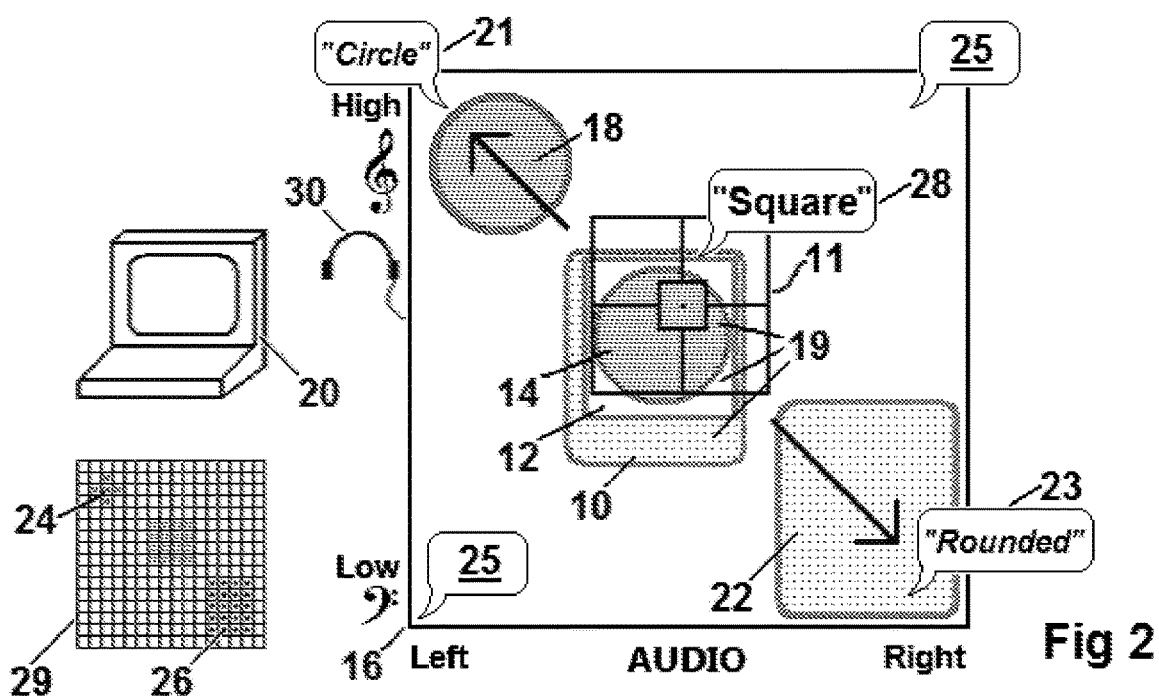
Fig 1
Fig 2

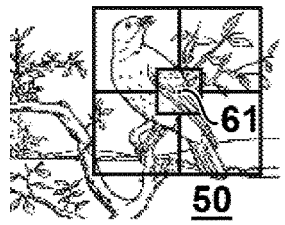
Fig 5
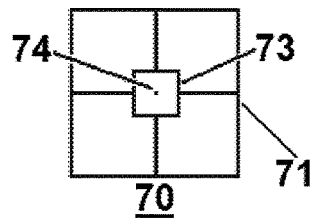
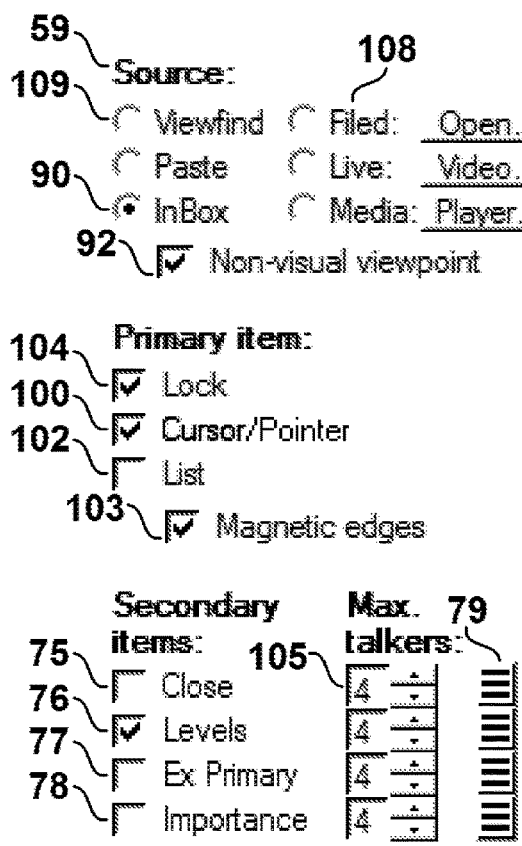
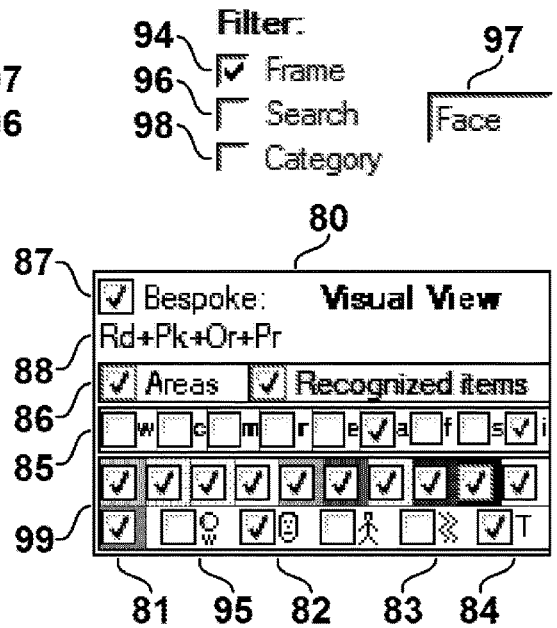
Fig 7
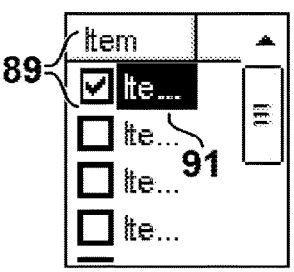

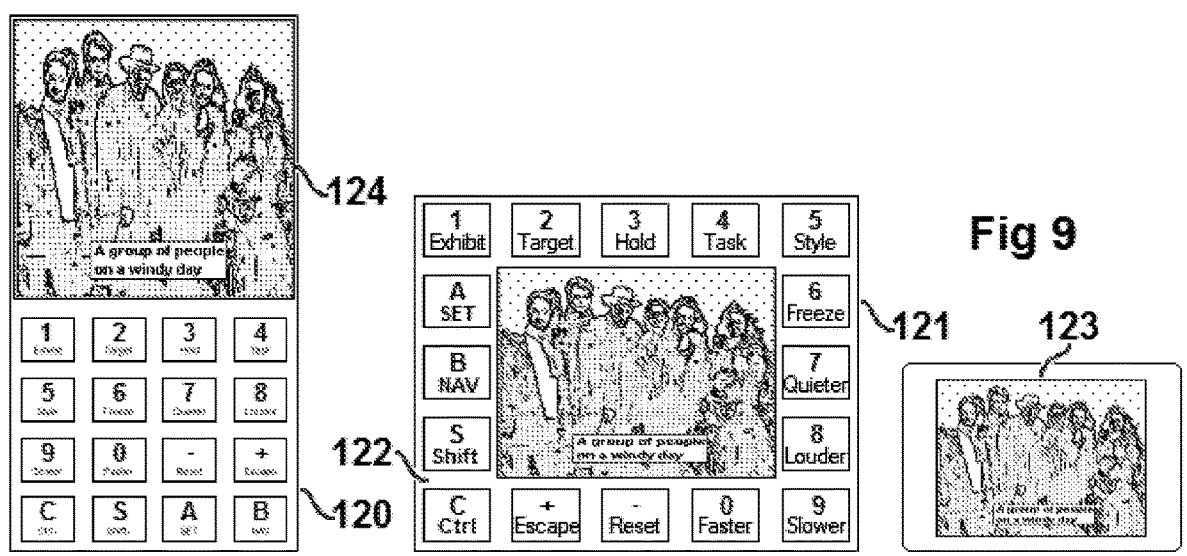

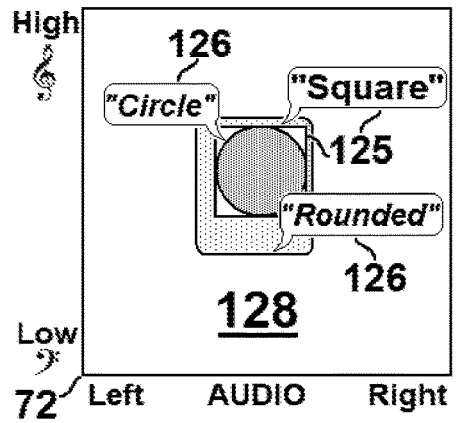
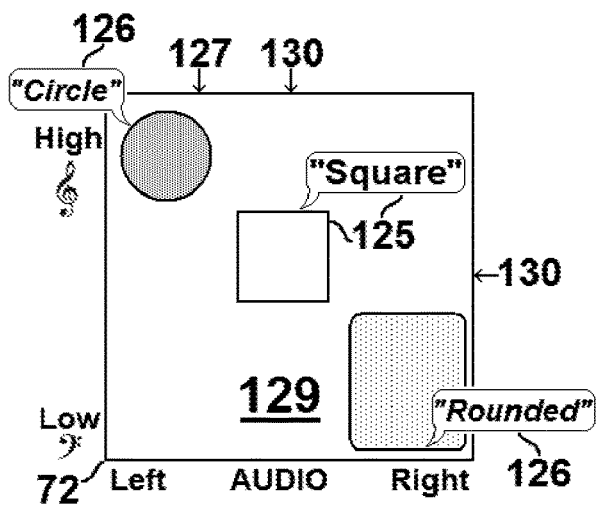
Fig 10
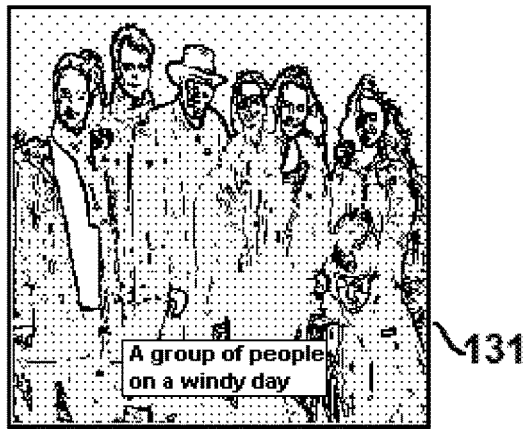
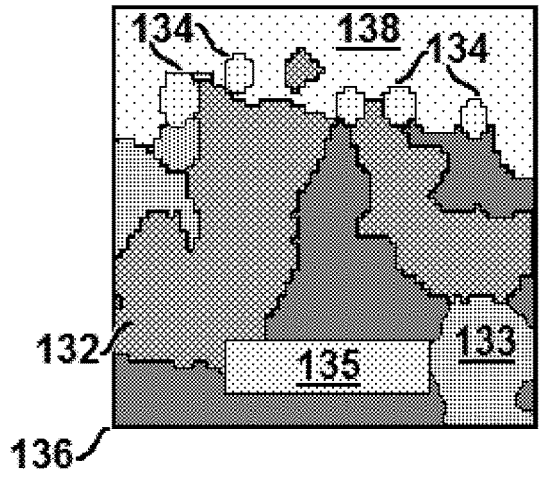
Fig 11

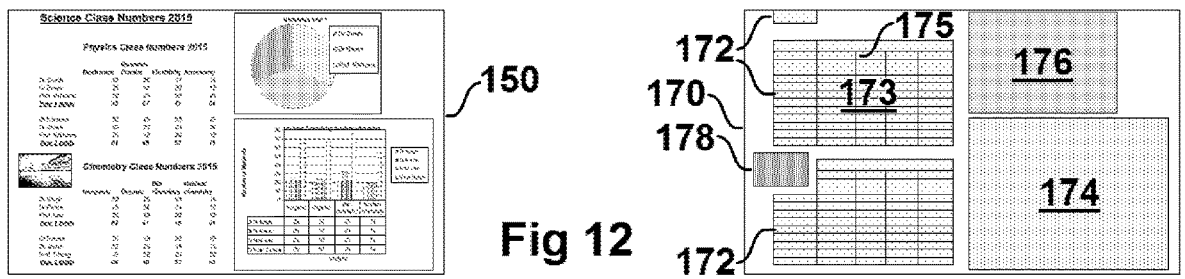

Fig 12

```
'Level 7 - 'Basic items' (Cells & Objects)
7\b1\Cell B1|Science Class Numbers 2015\$1 $70307\Sheet title
7\b2\Cell B4|$2 $70307\Physics
7\b123\Chart 1|Mechanics Year 1|Pie chart for Mechanics\$30303 $70307\Physics|Year 1
7\b124\Chart 2|1st Year Chemistry Student Allocation\$30304 $70307\Chemistry|Year 1

'Level 6 - 'Lines' (Columns or Rows)
6\g131\Block 2, Column 1||TypeA\b2 b7 b12 b17 b22 b27 b32 b37 b42 b47 b52 b57
6\g136\Block 2, Row 1||TypeB\b2 b3 b4 b5 b6

'Level 5 - 'Sets' (of Columns, or Rows)
5\g238\Block 2, 5 Columns\g131 g132 g133 g134 g135
5\g239\Block 2, 12 Rows\g136 g137 g138 g139 g140 g141 g142 g143 g144 g145 g146

'Level 4 - 'Blocks' : Level\Group ID\Word(s)
4\g254\Block 1, 1 by 1\g236 g237
4\g255\Block 2, 5 by 12\g238 g239

'Level 3 - 'Combinations' of Kinds and Blocks/Objects: Level\Group ID\Word
(s):Whatness|Content|Extras\Items
3\g263\All, 3 Blocks\g254 g255 g256
3\g264\All, 6 Objects (2 Charts, 3 Pictures, 1 Object)\b123 b124 b125 b126 b127 b128

'Level 2 - 'Kinds' : Level\Group ID\Word(s):Whatness|Content|Extras\Group Items
(Combinations of Kinds and Blocks/Objects, within Kind).
2\g273\All (3 Blocks & 6 Objects)\g263 g264
2\g274\Physics (Block & 2 Objects)\g265 g266

'Level 1 - View : 'Spreadsheet' : Level\Group ID\Words
1\g279\Spreadsheet : 'Science Class Numbers 2015' (6 Kinds, 3 Blocks & 6
Objects)\g273 g274 g275 g276 g277 g278
```

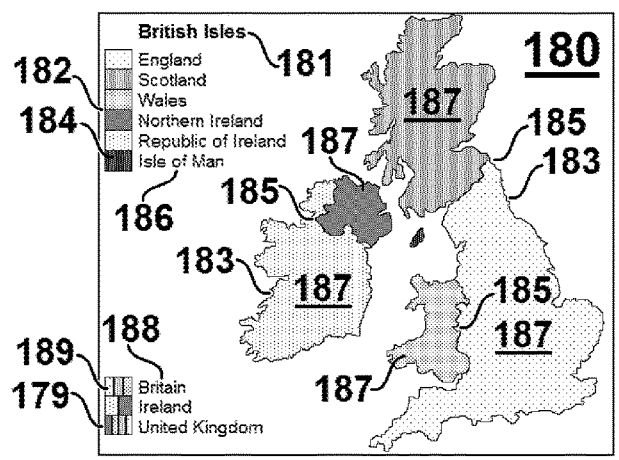

Fig 13

```
                                  ┌─192                   ┌ 'Level 5.
                                  │                       │ 5\b1\000 Computer science, information &
                                  │ 000 Computer science, │ general works\$1  $F0707
                                  │ information & general works │ 5\b2\001 Knowledge\$2  $F0707
                                  │                ┌─193  │ 5\b3\002 The book\$3  $F0707
                                  │ 000 Computer science, │ 5\b4\003 Systems\$4  $F0707
                                  │ knowledge & systems   │ 'Level 4.  195┘    ╲198┘
                                  │                       │ 4\g1001\Section 000 Computer science,
                                  │ 000 Computer science, │ information & general works\b1\1
                                  │ information & general works │ 4\g1002\Section 001 Knowledge\b2\1
                                  │ 001 Knowledge         │ 4\g1003\Section 002 The book\b3\1
                                  │ 002 The book  ┌─194   │ 4\g1004\Section 003 Systems\b4\1
                                  │ 003 Systems─┘         │         Fig 14
                                  │                       │ 'Level 3.           ┌─193    ╲194
                                  │                       │ 3\g1979\Division 000 Computer science,
                                  │                       │ knowledge & systems\g1001 g1002
                                  │                       │ g1003 g1004 g1005 g1006 g1007
                                  │                       │ g1008\8
                                  │                       │ 'Level 2.      ┌─192
                                  │                       │ 2\g2079\Class 000 Computer science,
                                  │                       │ information & general works\g1979 g1980
                                  │                       │ g1981 g1982 g1983 g1984 g1985 g1986
                                  │                       │ g1987 g1988\89
                                  │                       │ 'Level 1.    ┌─191                    199
                                  │                       │ 1\g2089\Dewey Decimal\g2079 g2080
                                  │                       │ g2081 g2082 g2083 g2084 g2085 g2086
                                  │                       │ g2087 g2088\1000
```

Fig 14

```
      ┌─226
 /Shopping         'Level 3.
 22nd April/┐218   3\b1\Acme Item Eggs\$1 $30101
 *Shop/Item/       3\b2\Acme Item 4 x apples\$100 $30101
    ╲220 ╲224     3\b3\Acme Item Flour\$101 $30101            Fig 15
                   3\b4\Acme Item Bananas\$10000    212
 * Acme              $30101                                      228
                   3\b5\Acme Item Salad\$10001 $30101
 Eggs              3\b6\Acme Item 3x soup\$10100 $30101
 4 x apples        3\b7\Acme Item Coffee\$10101 $30101
 Flour             3\b8\ABC Item White paint.\$20000
 Bananas             $30101
 Salad             3\b9\ABC Item Wood\$20001 $30101
 3x soup           3\b10\ABC Item Cement\$20100 $30101
 Coffee
   210             'Level 2.             ╲216
 * ABC╲213         2\g11\Shop Acme\b1 b2 b3 b4 b5 b6 b7\7
 White paint│      2\g12\Shop ABC\b8 b9 b10\3 ╲214
 Wood ┌─215        'Level 1.      ┌─226
 Cement┘           1\g13\Shopping 22nd April\g11 g12\10
```

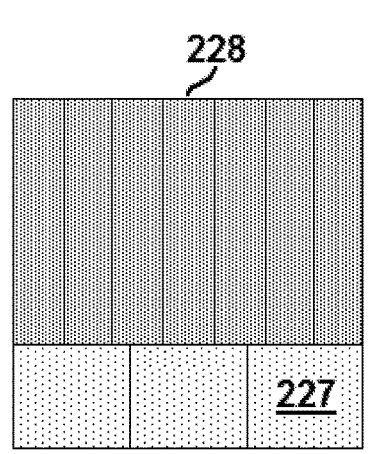

Fig 15

SYSTEM FOR PRESENTING ITEMS

CROSS-REFERENCE TO RELATED APPLICATIONS

This application claims the benefit of UK Patent Application number GB1610676.7, of the same title, and filed Jun. 19, 2016 by the present inventor, and UK Patent Application number GB1617017.7, of the same title, and filed Oct. 6, 2016 by the present inventor, both of which are incorporated by reference.

This application contains improvements to the inventions disclosed in the present inventor's U.S. Pat. No. 8,239,032 entitled "Audiotactile Vision Substitution System", UK Pat. No. GB2477431 entitled "Improved Audiotactile Vision System", and U.S. Pat. No. 9,430,954 entitled "System for Presenting Visual Items", all of which are incorporated by reference.

BACKGROUND

Field of the Invention

This invention relates to vision substitution systems, specifically to a method and apparatus for presenting audio and tactile representations of items such as visual items found within visual representations and non-visual items that are components of non-visual entities, for example for use by blind people.

Description of Related Art

The World Health Organization estimates that there are about 39 million blind people in the world. Devices have previously been invented that substitute for aspects of vision with another sense, particularly hearing and touch, and can be useful to blind and partially sighted people, and to those temporarily unable to see, for example aircraft pilots blinded by smoke. The approach is known as "sensory substitution" or "vision substitution". U.S. Pat. No. 1,350,954 discloses a reading machine that presents the shapes of letters by scanning along lines of type with a column of five spots of light, the reflected light from each spot controlling the volume of a different musical note, producing characteristic sequences of notes for each letter. U.S. Pat. No. 5,097,326 discloses presenting live images via sound. U.S. Pat. No. 6,963,656 discloses using musical sequences to convey features of images. Similar approaches have been used to sonify the lines on a two-dimensional line graph. Typically a left-to-right column scan is performed, height is mapped to pitch, and brightness to volume (either dark- or light-sounding). Horizontal lines produce a constant pitch, vertical lines produce a short blast of many frequencies, and the pitch of the sounds representing a sloping line will change frequency at a rate that indicates the angle of slope.

In the tactile modality, several inventions have allowed visual features to be presented via touch, usually via an array of tactile actuators (typically vibro-tactile or electro-tactile) acting on parts of the user's body, for example Telesensory's™ Optacon™ finger-read vibro-tactile array; U.S. Pat. No. 6,430,450 and Wicab's™ Brainport™ tongue-placed electro-tactile display; U.S. Pat. Appl. No. 2010/0151426 and EyePlusPlus's™ Forehead Sensory Recognition System electro-tactile display; electromechanical tactile abdomen displays; and KGS's™ 8 by 8/64-dot tactile display. The present inventor's U.S. Pat. No. 8,239,032 describes a palm-read tactile display. Furthermore, standard programmable braille displays 45 FIG. 3 can be configured to act as displays of simple visual representations.

The present inventor's U.S. Pat. No. 8,239,032 entitled "Audiotactile Vision Substitution System" discloses a system for presenting one or several apparently-moving speech sounds and corresponding tactile effects 48 & 31 FIG. 3, referred to as "tracers" 32 & 35 and "polytracers" 33, that trace out the shapes of lineal features (for example outlines of items 34), or symbolic shapes 35, at the same time as presenting information 36 related to the items, with distinct audiotactile indicator effects highlighting corners 37 within the shapes. The present inventor's UK Pat. No. GB2477431 entitled "Improved Audiotactile Vision System" discloses using buzzing tracers and outputting distinct effects when tracers cross the borders 38 FIG. 3 between elements of a regular lattice, to improve the perception of shapes. The present inventor's U.S. Pat. No. 9,430,954 entitled "System for Presenting Visual Items" discloses presenting visual items via groups of stereophonic sounds 39 FIG. 3 and tactile effects 40, referred to as "imprints", which can be speech-like sounds 41. The dispersed effect of the range of pitches and stereo locations of the voices resembles the sounds of a crowd of people speaking in unison, and rapidly conveys the properties, approximate size, shape, and location, of the presented items. "Layouts" 42 FIG. 3 present the locations of items' content, via plain or coded speech sounds 43 & 44, braille 45 (or via an "Optacon" or other tactile array), or coded Morse-like taps 46 & 47.

The specification and drawings of U.S. Pat. No. 8,239,032, UK Pat. No. GB2477431, and U.S. Pat. No. 8,239,032 are incorporated by reference, and copies are obtainable from the Internet and elsewhere.

The "GATE" (Graphics Accessible To Everyone) project uses a graphical structural hierarchy defined by ontology to inform the user about the graphical content in a picture in a non-visual way. The Web Ontology Language "OWL" provides a technical framework for annotating pictures with a semantic hierarchy that includes attributes of described objects. An approach used by the US Navy for attending to two or more voices is to accelerate each voice, and then serialize them.

SUMMARY OF THE INVENTION

In accordance with preferred embodiments a method and apparatus for presenting items includes presenting particular ("primary") item(s), selected for the focus of attention, via sensory effects (for example audio and/or tactile effects such as unmodified speech-like sounds); and simultaneously presenting other ("secondary") items, said other items each including categorically-distinct effects (for example distinct types of voice, stereophonic location away from the primary items, or distorting effects such as echo and reverberation effects); whereby users can have their focus of attention directed to item(s) with particular properties that are emphasized, whilst they are simultaneously made aware of things which are not emphasized.

Comparison of Present Invention to Prior Art

The present inventor has previously disclosed using multiple voices to present several parts of an image simultaneously, using volume to emphasize particular items if several are presented simultaneously; and navigation around visual structures. Such previous approaches differ from the present embodiments in that the present embodiments use categorically-distinct effects applied to secondary items, which are clearly and perceptibly distinguishable from the effects applied to primary items, by being substantially different in nature, and not used for primary items. Categorically-distinct effects can be for example distinct types of voices (e.g. monotone, or with intonation), stereophonic location away from the primary item, and special effects such as echo and reverberation.

The present invention is an improvement of the earlier inventions, as it discloses a method for directing the user's focus of attention to particular things with particular properties while simultaneously allowing the user to be aware of other things.

The effects that are produced by the embodiments are referred to as "Focus effects" and direct the user's focus of attention to particular items, whilst at the same time making them aware of other co-located, or separate, items.

The approach can be used in conjunction with the previously-disclosed methods, and it has application to previously-described applications.

One aspect of the present invention is presenting information, for example hierarchical or linked information, by classifying it in certain ways and allowing the user to navigate around said hierarchical or linked information. Such information can be visual or non-visual.

BRIEF DESCRIPTION OF THE DRAWINGS

Note:— a) Drawings may include musical treble and bass clef symbols to pictorially signify change in pitch with height. Though audio effects may commonly use such mappings, other mappings may be used instead.

b) Speech bubbles denote speech sound effects.

Example embodiments of the invention will be described with reference to the accompanying drawings in which:—

FIG. 1 shows a summary flowchart.

FIG. 2 conceptually illustrates the method and apparatus.

Figure 3:
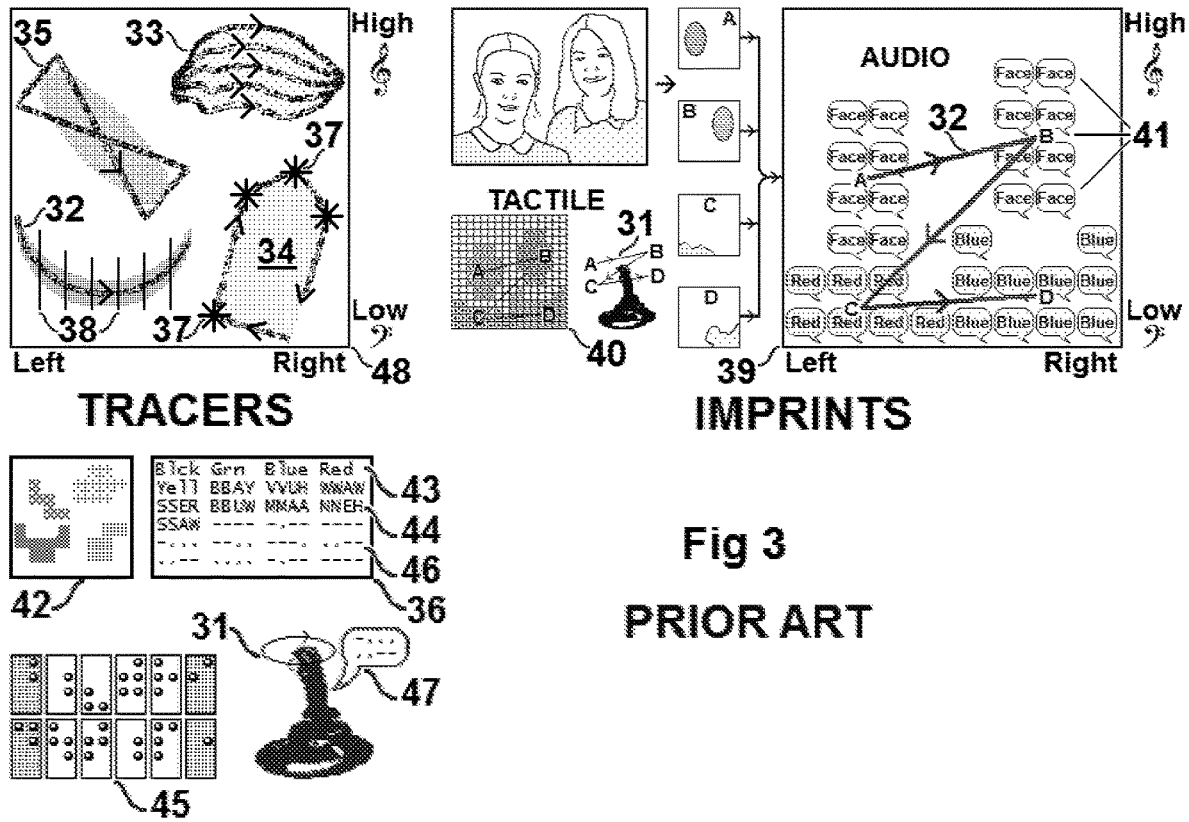

FIG. 3 summarizes prior art features including tracers, polytracers, and imprints.

Figure 4:
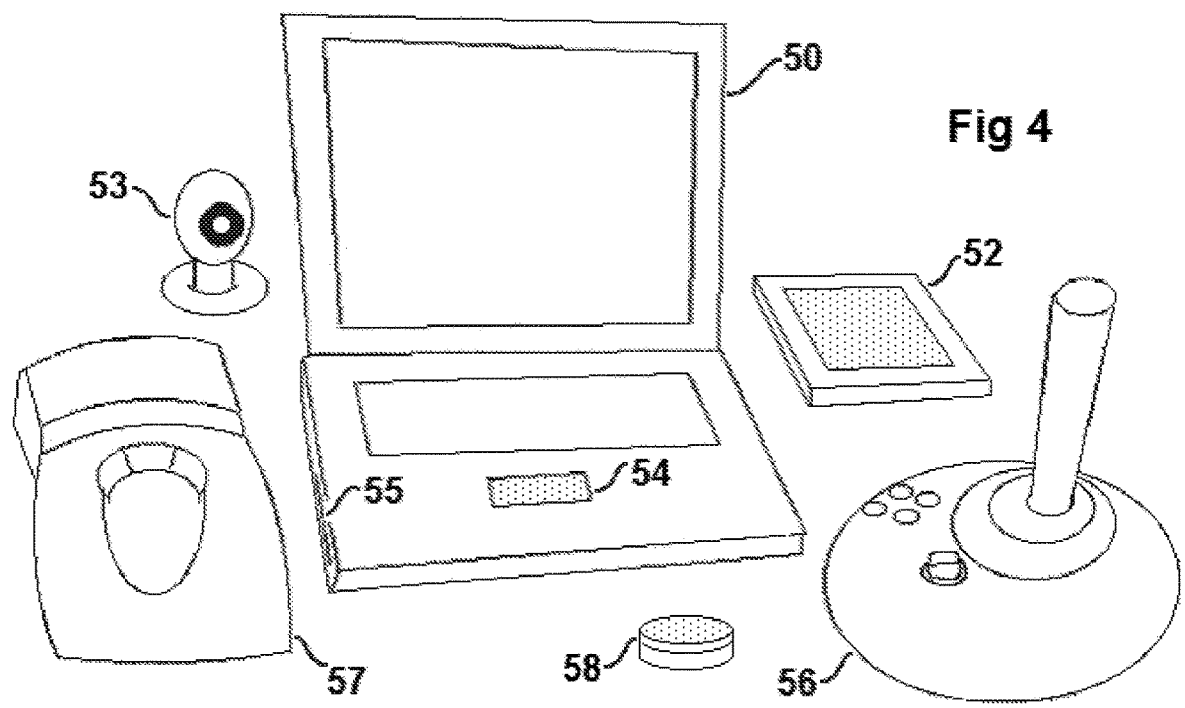

FIG. 4 shows a low-cost embodiment, which uses only standard hardware components.

FIG. 5 shows examples of items at different levels of view below the pointer within the "scope".

FIG. 6 illustrates the "scope".

FIG. 7 shows parts of the user interface (UI) for an embodiment.

FIG. 8 shows parts of the UI controls for performing ordered control of several user interaction methods.

FIG. 9 shows several main image and on-screen grid (OSG) arrangements.

FIG. 10 illustrates multi-talker focus effects including effect relocation.

FIG. 11 illustrates how a visual image can be processed into:—an "ItemMap" bitmap showing "basic item" blobs; and an "ItemKey" text file which describes how basic items are marked, and consolidated into "group items".

FIG. 12 shows a spreadsheet and parts of its corresponding ItemMap and ItemKey.

FIG. 13 shows a simple map that contains a text and color patch legend that can be used to automatically present its items via meaningful effects.

FIG. 14 shows parts of a classification system and parts of its corresponding ItemMap and ItemKey.

FIG. 15 shows a shopping list and its corresponding ItemMap and ItemKey.

This specification does not repeat all of the material contained in referenced and incorporated U.S. Pat. No. 8,239,032, UK Pat. No. GB2477431, and U.S. Pat. No. 9,430,954, which describe construction methods in detail.

This specification should be read in conjunction with the specifications and drawings of U.S. Pat. No. 8,239,032, UK Pat. No. GB2477431, and U.S. Pat. No. 9,430,954, and the features and content applied where appropriate to this specification, with appropriate modifications.

This description includes the following sections, which are numbered so that they can be cross-referenced:—

1. DESCRIPTION OF METHOD AND APPARATUS, AND EXAMPLE EMBODIMENTS
2. HARDWARE & SOFTWARE
2.1 HARDWARE
2.2 SOFTWARE
3. DETAILED DESCRIPTION OF THE STEPS
4 FEATURES
4.1 THE "SCOPE"
4.2 OBTAINING RELATED ITEMS: CASCADING AND LINKING
4.3 PROPERTY AND EFFECT TYPES
4.4 OTHER FEATURES
5. GLOSSARY
6. CONCLUSIONS

1. DESCRIPTION OF METHOD AND APPARATUS, AND EXAMPLE EMBODIMENTS

In this section example embodiments are described in order to overview the main features of a typical embodiment. The invention will be described in more detail in following sections.

1.1 Overview

"Multi-level multi-talker focus effects" FIGS. 1, 2 & 10 are designed to work as follows:—the system presents the "primary" item(s) that are currently the focus of attention via crisp/non-modified sounds (and optionally via tactile effects), for example via speech sounds. At the same time the system presents the speech sounds for "secondary" items, that are not at the focus of attention, but applies a categorically-distinct differentiating effect on them, for example by changing the type of speaker voice (e.g. from monotone to one with intonation), by applying echo or reverberation effects, by relocating the effects, or by applying other effects.

"Categorically-distinct" effects are defined as being effects that are included in the effects applied only to secondary items, and which are clearly and perceptibly distinguishable from the effects applied to primary items, by being substantially different in nature and not used for primary items. For example different types of voices (e.g. monotone, or with intonation), stereophonic location away from the primary item, and special effects such as echo and reverberation.

The effects may be perceived in a similar manner to the effect of shallow depth of field in a photograph, where the focused elements are accentuated and the observer's eye is directed to them, and out-of-focus elements are also present which the observer is aware of but not directed towards. The user can interactively control the focus of attention presented by the focus effects.

Focus effects may produce a qualitatively different impression on the user from the previous approaches. The approach is illustrated by the following examples:—

FIG. 5 shows two scenes, one relating to the countryside (a bird perched on a branch of a tree 50), and the other relating to office administration (a computer spreadsheet 60). In both cases a pointer 61 & 63 is positioned over part of the scene. In the first example 50 the pointer 61 is over one of the bird's feathers. If a sighted person's center of gaze is similarly positioned, without moving their gaze the sighted person's attention could be concentrated on either:— one of the bird's feathers; or the bird's wing; or the bird; or the branch on which the bird is perched; or the part of the tree in their field of view.

In a similar manner for the spreadsheet 60 the pointer 63 is over a particular cell, but is also over a column of cells 64, a row of cells 66, a block of cells 68, and the spreadsheet 60. Likewise the user's focus of attention can be drawn towards any one of these spreadsheet items (cell, column, row, block etc.) while at the same time the user can be made aware of the other co-located items, which are at different levels of view.

A blind user can rapidly navigate between such levels, for example by using a mouse wheel or dial 58 FIG. 4, hearing the effects speaking the item at the level of view that is currently emphasized (e.g. cell, column, row, or block), and at the same time being made aware of the items at levels above and below the current level of view, which have distinguishing effects applied (e.g. voice character, apparent location etc., and optionally echo and/or reverberation).

The degree of directed focus and the amount of the de-emphasizing effects presented via focus effects can be presented via a sharp step-change in the effects, so that the emphasized (primary) item(s) at the center of attention are clearly different in perceived quality from the non-emphasized (secondary) items. The effects can be related to the difference in particular property values ("focus property values") of the de-emphasized (secondary) items from the property value of the (primary) item(s) currently being emphasized.

The particular property/focus property value can be the "level of view", representing for example the wideness (high-level) or detail (low level) of particular properties for an item. For example for the computer spreadsheet 60 FIG. 5, at any one point 63 the level of view emphasized can be the (low-level/detailed) cell 62 at that point; or alternatively the wider, high-level cell block 68 containing the cell can be emphasized (with the cell column 64, and cell row 66, containing the cell 62 being of intermediate level). The system includes mechanisms to facilitate the rapid navigation between such levels of view, for example by using a mouse wheel.

The particular property/focus property value also can be for spatial properties such as the item's distance or lateral distance, or can be a visual property value FIG. 11, or level of view, or non-visual and non-spatial property FIG. 15.

Several such differentiating effects can be active simultaneously.

Focus effects can also be used to present property values of non-visual and non-spatial properties, for example levels of categorization and analysis, as found in many academic fields. For example the Linnean classification system, the entities on a map (continents, countries, regions etc.), and the Dewey Decimal Classification System™ can be presented and navigated round using focus effects, as described in section 1.5.3 below.

The focus effects FIGS. 1, 2 & 10 will typically have higher user interaction than the previously-developed tracers 48 FIG. 3 and imprints 39 & 40, as the user will generally want to actively control the items presented by the new effects. When combined with previously-disclosed features such as imprint effects, buzzing shape-tracers and corner effects, and polytracers, several items can be perceived simultaneously. Tracers and imprints can be combined with and presented using the new effects. For tracers, imprints, and focus effects, vertical position can be mapped to frequency, and horizontal position to left-right stereophonic positioning in "soundspace" 16 FIG. 2.

The user can control which items are being presented, for example via a mouse pointer, or via touch; or the system can automatically sequentially step around or list the most important items found within a user-defined area (including the whole image).

Several interaction methods are available and are described, for example coded tapping, and touch-pad control, and their application to focus effects, for example to drill down and up levels of view.

The system presents images and non-visual material via sets of audio and tactile effects. Multi-level multi-talker focus effects direct the user's attention to particular items, while at the same time making them aware of other co-located or separate items. Additionally, the system allows presenting and navigating multi-level representations of visual scenes, and of non-visual and non-spatial information and entities. External client application-generated (or manually produced) material can be submitted to the system. The system can be controlled via several interaction methods, including using multiple taps on parts of images to command the system 114 FIG. 8.

The embodiments can be used by partially-sighted, blind, and deafblind people. They may be used as vision substitution systems, as mobility aids, or to find out particular pieces of visual information. They can be used to present information to sighted people in various applications, for example as part of a presentation system; training aid; game; toy; or puzzle. The embodiments can convey a prepared program of pre-defined material, and the sounds and tactile effects produced can be used for artistic purposes, and can be recorded or broadcast. Several special applications will be described.

This description outlines the processes that are followed when the system is operating, and can be regarded as an outline functional specification of the software (see section 2.2 below).

Several preferred embodiments will be described. Preferred embodiments can be constructed using bespoke hardware and software, or can be created using existing components FIG. 4 with bespoke software. The embodiments use several methods to substitute for aspects of vision, and this specification contains some repetition and cross-references. Numerous similar methods can be devised, and the scope of the invention is not limited to the examples described herein.

1.2 Cocktail Party Effect & Relocating Effects

The system makes use of the "cocktail party effect" i.e. being able to focus one's auditory attention on a particular presented item while filtering out other sounds. The system can artificially separate the presented items 129 FIG. 10, so that the cocktail party effect is maximized (Note that the term "cocktail party effect" is sometimes used to refer to the effect wherein certain words, typically the listener's name, suddenly catch their attention, though the words are being spoken in a conversation which they are not part of. In this description the term is used for its other meaning, of being able to follow one particular speaker when several are speaking.)

Tests show that the cocktail party effect works best as a stereophonic or binaural effect i.e. with speech stereophonically separated (with voice character, pitch, etc. also contributing). However as the several levels/items being presented 10, 12 & 14 FIG. 2 will often be co-located or in close proximity 19 FIGS. 2 & 128 FIG. 10, the system can artificially separate the items in soundspace i.e. both in pitch and left-right stereophonic positioning 18 & 22 FIGS. 2 & 129 FIG. 10, so that the cocktail party effect is maximized.

Deliberately spreading out (i.e. relocating) the voices 126 in soundspace 21 & 23 FIG. 2 is not as confusing as might be expected, as the currently-emphasized subject of attention (primary item) 12 FIGS. 2 & 125 FIG. 10 is mapped to its unadjusted corresponding location via pitch and left-right stereophonic positioning 28, and the relocated de-emphasized (secondary item) effects 21 & 23 FIGS. 2 and 126 FIG. 10 are identified as such via their audio properties, and by their apparent locations (e.g. in the corners of the audio display 18, 22 & 25).

If focus effects at one point or small area 128 FIG. 10 are artificially spread out 129 FIG. 10, the items may be near the edge of the "soundspace" 149, and there may be no room for them to move to (not shown). For Left-Right stereophonic positioning the location can be switched to another location e.g. to the center 130, in order to keep the sounds separated, but the pitch can go beyond the range of the "soundspace" 149, or alternatively the pitch can also switch (not shown). Alternatively the Left-Right stereophonic range can be reduced for standard use, so providing extra room to produce further spaced-out Left-Right panning effects when required (not shown).

A similar approach can be used in the tactile modality. The items that are not the center of attention can be relocated 24 & 26 FIG. 2 on the tactile display 29. The nature of such effects can be different and/or reduced when compared to those for the center of attention.

One useful feature is to temporarily "flip" the location of the extra voices 126 FIG. 10 if the primary voice 125 gets near to them in pitch or pan separation. For example if an extra voice 126 is located in the top left corner of the audio display 129, as the main talker/primary voice 125 moves left, when it gets to within for example ¼ of a screen-width 127 of the left edge, the secondary voice 126 panning is flipped to the center 130 of the audio display (not shown), and later flips back to the left edge as the main talker voice moves back towards the center. A similar effect can be performed with the pitch of the extra/secondary voices 126 as the main/primary voice 125 moves in the in the vertical direction (not shown)

1.3 Producing the Effects

One example embodiment system can be implemented using a high-level programming language, for example Microsoft's™ Visual Basic™, or C++, and can be implemented on a standard Windows PC 20 FIGS. 2 & 50 FIG. 4 (and can run virtualized on other operating systems).

The open source library OpenCV can be used to perform computer vision tasks such as face recognition, optical flow motion detection, and Camshift tracking; and the open source engine Tesseract can be used to perform optical character recognition (OCR).

The Logitech™ Wingman Force Feedback Mouse™ 57 FIG. 4 and Microsoft Sidewinder Force Feedback 2™ joystick 56 are controlled via Microsoft's DirectInput™ methods.

In one example embodiment the audio is primarily speech-like. If only a limited number of different words will be presented, for example colors and certain recognized items such as faces or motion, then recorded speech samples can be used, using a similar approach to that described in the referenced and incorporated earlier patents. However if any words may need to be spoken, then a different approach can be used:—Windows SAPI Text-to-Speech synthesis (TTS) output is saved to a standard sound (.WAV) file, which can then be pitched and panned on replay as and when required (using Microsoft's DirectSound™ SetFrequency and SetPan methods).

It is advantageous to use an even-level voice for the main (primary) talker voice 28 FIG. 2, & 125 FIG. 10 (most modern TTS voices speak with considerable intonation/prosody present). The eSpeak open source SAPI speech synthesizer software can be used for the main talker voice, as it can be set to produce a flat voice output, and is therefore more suitable for conveying the pitch-to-height mapping. Other TTS voices can be used for the secondary focus effect voices 21 & 23 FIG. 2, & 126 FIG. 10, as they are typically stationary and not attempting to convey precise location through pitch.

When multiple voices are speaking, the voices can be differentiated via:—voice character of the speaker (sex, accent, etc.); pitch; left-right pan positioning; special effects such as echo, reverberation, flange, gargle, etc.; and speaker start time offset. If Microsoft DirectX™ sound is being used then, for example, DirectX Audio sound effect types echo and reverberation can be applied when presenting the effects. The DirectSound SetVolume, SetFrequency, and SetPosition or SetPan methods, can be used to set the volume, height-conveying pitch, and stereophonic sound position respectively of the sound waveforms.

Typically the main talker voice 28 FIG. 2 will move to convey location and shape, while the extra voices, presenting the additional information, will be located in fixed positions, for example near the corners of the audio display 21, 23 & 25.

1.4 Visual-Domain Processing, and Client-Domain Views

The system can take a visual domain view of the items in a visual image FIG. 11; or process the items from a special standpoint or domain view (for example as described for a spreadsheet FIG. 12 in section 1.5.1 below). The view/standpoint that the system takes is referred to as the "Viewpoint" (sometimes shortened to "View"). External/client-supplied material (e.g. non-visual material) can have items from a particular viewpoint included 92 FIG. 7, as described in section 1.5.2 below.

With the Visual viewpoint, entities such as a filed or live images can be processed into a set of blobs 132 FIG. 11, for example areas of 133 color or other properties, recognized entities such as faces 134, areas of movement, etc., which are then presented via audio and tactile effects, including focus effects—the vision filter 80 FIG. 7 acts as a category filter 98.

In the visual domain viewpoint, the system can produce higher-level consolidations of basic image content. The visual filter UI 80 FIG. 7 allows users to select the Level 4 categories of basic visual items that they want to have presented e.g. Reds 81, Faces 82, OCR Text 84, etc.; and to select higher-level group item consolidations, as described in section 1.5 below.

The system performs standard computer vision processing, reducing the image 131 FIG. 11 to a set of "blobs" 132 both of areas of particular properties e.g. colors 133, and recognized items such as faces 134, or text 135. These are referred to as "basic items". The system can then consolidate the blobs into higher-level items, referred to as "group items". For example from e.g. Level 5 individual colored blobs and recognized items (e.g. Red 2, Face 1 134 & 135, Text 1 135 & 137, etc.) the system can consolidate to Level 4 groupings 140 (e.g. Reds, Faces 141, etc. 99 FIG. 7), to Level 3 142 (e.g. monochrome areas, "rainbow"/spectral-colored areas, found items etc. 85 FIG. 7), to Level 2 144 (Areas of color, and Recognized items 86 FIG. 7), and to a single Level 1 group item for all items in the visual image from the visual viewpoint 146 FIG. 11. The Level 1 item identifies the type of entity and viewpoint (e.g. general visuals domain view/viewpoint), and can be switched to and from other viewpoints that may be available 92 FIG. 7, and that may use a client-domain view, as described in section 1.5 below. FIGS. 11, 12, 14 & 15 illustrates example consolidations and show the resultant ItemKey files.

Furthermore, bespoke combinations of properties can be specified for particular tasks 87 FIG. 7. For example for highlighting "red tomatoes", specifying the bespoke combination of colors "Red or Pink or Orange or Purple" 88 will generally produce clearer tomato-shaped blobs, as the combination covers the range of found shades.

Additionally, cascaded items can be produced from basic items, and are at lower levels. For example if a face is detected, then standard facial features can also be deduced from a standard library face that includes e.g. a Level 6 feature Eyes, Level 7 Left eye, Level 8 Iris etc. Such levels and items can be interacted with in the same way as for higher-level items (not shown) (see section 4.2.1 below).

While the system knows how to consolidate general images, it does not know about other domains/viewpoints such as, for example, Excel™ spreadsheets. Instead such entities can be submitted to the system as client entities, for the system to present. For example consider the spreadsheet 150 FIG. 12. Although it could be presented from a visual-domain viewpoint i.e. as a series of patches of color and perhaps some text recognition, it is more meaningful to be able to inspect it via a spreadsheet-domain viewpoint 92 FIG. 7, consolidating basic item cells 151 & 172 FIG. 12 (and objects such as charts 152 & 174 and pictures 178) (Level 7) to columns and rows 153 (Level 6), then to sets of columns and rows within block 154 (Level 5), then to individual blocks 155 (Level 4), then to combinations of blocks (and objects) of certain "Kinds" 156 (Level 3), then to content of Kinds 157 (Level 2), then to top level viewpoint/view Spreadsheet 158 (Level 1). 160 FIG. 12 shows the resultant ItemKey file (described in section 1.5.1 below). Many similar consolidation methods can be devised.

Such higher-level view groupings provide meaningful summaries/overviews of content, and help with navigating around the items of an image or entity.

The system can use a particular computer folder as an in-box 90 FIG. 7, into which client applications can deposit entity files for potential presentation. The system can then process and present all, or some, of them (or none), and can optionally delete them after presentation.

1.5 Interfacing to Internal and External Entities

In order to present externally-processed images and other entity types via the system, and to simplify development of the main system, a straightforward interfacing method can be used. This comprises submitting a standard 24-bit color bitmap (e.g. .BMP) file 136 FIGS. 11 & 170 FIG. 12 (referred to as the "ItemMap" file) that has the extent of all of the required basic item blobs marked on it, by setting certain bits of the pixels present in the areas occupied by the items. These marker bits typically use the least significant pixel bits of the 24-bit color bitmap in order to minimize the visual impact of the marker bits. A standard text (e.g. .TXT) file 148 FIGS. 11 & 160 FIG. 12 (referred to as the "ItemKey" file 148) describes how those blobs are marked via particular bit settings 147 FIG. 11 on the bitmap 136, and specifies how those blobs are consolidated to higher-level items. This pair of files, that fully describes the blobs of the image/entity, and how they are consolidated, can be created manually using a simple image painting application and a text editor, or can be created via an external application (see below). They can also be produced internally by the system to produce standard visual viewpoint consolidations FIG. 11 in order that a common interface is used for all entities.

For more complex entities some blobs may overlap, for example faces 134 and color blobs 138 FIG. 11. For this example two ranges of bits are used, one for the faces 145, and one for the colored blobs 149. This is because a face and a colored blob can both occupy the same part of the bitmap, so separate bit ranges are required, and the system can reserve a certain number of bits in the 24-bit bitmap 136 for particular sets of non-overlapping blobs. Such content is resolved by the ItemKey text file 148 FIG. 11, which specifies which bits are significant 145 & 149, and their values 147 for particular items.

1.5.1 Interfacing to a Spreadsheet

FIG. 12 shows a spreadsheet 150 and parts of its corresponding ItemMap 170 and ItemKey 160.

160 FIG. 12 shows part of the ItemKey, which uses 9 bits that can form 512 combinations i.e. identify 512 different objects. Each cell 175 & 177 has a unique bit pattern 164 assigned to it formed from the group of bits 166. On the bitmap showing the layout of the spreadsheet 170 the pixels covering the area of each cell have their pixels bits so set. The cells are further classified so that particular groups of cells e.g. 153 can be selected. The bits used for identifying the cells are the three least significant bits of each of the three color channels Red, Green and Blue. These are selected to minimize the visual impact of the marker bits.

For the Spreadsheet entity example described above, it would be an arduous task for someone to mark-up 170 FIG. 12 all of the cells and objects of an Excel spreadsheet 150, and then create a text file 160 describing them.

Instead an Excel VBA "add-in" can be developed, which can be triggered for typical Excel spreadsheets 150. It paints corresponding rectangles etc. 170 equal in size to each filled cell 172 or object (graph 174, chart 176, picture 178 etc.), each such item having a unique color shade. This can be achieved for example by using the Excel VBA facilities such as:—testing for used cells using the IsEmpty function; processing all applicable Shapes; and using the AddShape method to paint rectangles, with the property ForeColor set to the exact color representing particular e.g. cells 172, with a list of basic items 151 & 152 and corresponding colors 164 & 162 created at the same time.

The basic items can then be consolidated up to higher level items such as blocks 173 by, for example, doing standard recursive flood-fills to determine contiguous groups of cells that form blocks. The add-in can thus produce a corresponding ItemKey text file 160 that describes the content of each blob, with one line for each item 175 & 177, and details of consolidations for columns and rows 153, blocks 155 etc.

A snapshot of the spreadsheet 150 FIG. 12 can be taken (e.g. using the VBA Copy and SavePicture methods), and merged with the ItemMap bitmap 170—the marker bits use the least significant bits of the pixels in the 24-bit color bitmap, and their presence is typically invisible to sighted users.

The system does not know about Excel, but processes the resultant pair of files like any other, getting item identifier bits from the ItemMap bitmap pixels 170, then looking up the corresponding item details (e.g. words to speak) from the ItemKey text file 160.

1.5.2 Interfacing to Other Client Entities

The interface design is versatile, and many different types of client application-created entities, or manually-created entities, can be submitted using it. Client applications such as movie players (with or without specially marked-up items), graph and charting applications, and drawing applications, such as those described in the referenced and incorporated earlier patents, can pass item information to the interface, for presentation via the system's audio and tactile effects. The ItemMap bitmap and ItemKey text file can then be processed by the system, and the user can browse the content in "pointer" mode 100 FIG. 7, or have items automatically stepped round 102, or can lock on an item 104 and explore further from there (see sections 1.6 & 1.7 below).

It is not always necessary to submit separate ItemMap and ItemKey files. The ItemKey text file content can be directly added to the end of the bitmap file (which will normally still be presentable as a standard image file), and can later be separated by the system (not shown). This allows the bitmap file to be viewed by sighted people using standard media players (which do not normally detect such additions to the file), but when the file is processed by the system, the system can detect if the ItemKey text is present, e.g. by searching for a distinct set of identification data at the end of the file. If this is found then the text information can be separated and processed as normal. If the system is being developed using Visual Basic, then the "Put" statement can be used to rapidly add text to a bitmap file; and the "Get" statement can be used to rapidly extract the text. Such image files can generally still be opened by other standard image-related applications.

Alternatively, one of either of the files can be used to create the other, as illustrated in the following examples:—

1.5.3 Pseudo-Visual Representations

Non-visual multi-level/structured entities may be presented as pseudo-visual/spatial representations.

For example FIG. 14 shows parts of a classification system 190 and parts of its corresponding ItemMap 200 and ItemKey 199. For the Dewey Decimal Classification System™ 190 & 191 FIG. 14 the levels might be Level 2 Class 192 (e.g. 500/Science)—Level 3 Division 193 (e.g. 510/Maths)—Level 4 Section 194 (e.g. 516/Geometry)—Level 5 Sub-section 195 (e.g. 516.3/Analytic Geometry) (with Level 1 191 giving the entity/domain/viewpoint name). The lowest level items i.e. Sub-sections 196 can be automatically marked on a bitmap 200 as block patterns of rectangles, each of a unique color shade, which can then be consolidated up through the levels to the higher-level group items in the same manner as is done for standard visual entities. Then when presented as audio (and tactile) effects, the user can obtain an impression of the size and distribution of the items at each level of the entity.

The system can produce this by initially counting the lower level items that comprise each group item, then splitting the "pseudo-image" 200 into rectangular areas 197 each sized according to the basic item count for the group items at Level 2 (i.e. Class), then within each such rectangular area 197 splitting further according to the next level content, until a pattern of similar-sized small rectangles 196 representing the basic items is produced, grouped according to their higher-level classifications. The rectangles 196 can then be filled with colors wherein the bits patterns indicate the precise basic item represented by each rectangle.

In use, the user can freely move the pointer (for example via a touch-screen) e.g. to find a higher-level group item e.g. 197, lock on it, and then explore the lower level items within that item.

In each case the system can obtain the color of the e.g. touched areas, isolate the significant bits 198 and hence read off the basic item 195 from the ItemKey 199 FIG. 14, then if required find the group item at the requested level of view e.g. 192 that contains the basic item, and present the corresponding information.

In this way a spatial/dimensional impression of a non-visual entity can be produced.

Simple entities such as lists, for example a shopping list 210 FIG. 15, can be processed and presented in a similar manner—either as a simple list which can be presented as a single-level set of rectangles (not shown), or as a list such as 210 FIG. 15 (and its corresponding ItemKey 212 and ItemMap 228) that has two active levels:—the shops 213 & 214, and items 215, 216 & 227 to be purchased at each shop. A header line 218 shows how higher level items are identified ("*") and what they are (shops) 220, what the basic items are 224, and the top level viewpoint description 226. From this the system can produce ItemMap 228 and ItemKey 212.

1.5.4 OCR-Read Key/Legend

A bitmap comprising a few colored areas 180 FIG. 13 could just be presented as colored areas. Alternatively, a simple key/legend 182 can be included on the bitmap 180, in which the meaning 186 of each color shade is written next to a patch 184 of that particular shade. OCR can recognize the legend text 186, then the system can link the text 186 to the adjacent shade 184, to give it meaning, allowing the bitmap alone to be presented meaningfully to the user: the system can extract the text and build a small ItemKey file based on the text and adjacent shades (not shown).

Higher-level group items can be included by writing the higher-level terms 188 next to patches 189 containing the several shades that represent the basic items that comprise the higher-level group items. (The topmost non-key/legend wording 181 is assumed to be the title/Level 1 entity name.)

The user can then access the map as if it was set up as a standard pair of text and bitmap files, hearing meaningful terms.

(Similar diagrams of few colors can be compressed to much smaller ".GIF" files, though restricted "web safe" colors should be used so that color information is not lost.)

1.6 Using Multi-Level Multi-Talker Focus Effects 1.6.1 Filters

In use, the items for presentation are optionally filtered in some way, for example those items within the area of the frame 71 FIGS. 6 & 94 FIG. 7, those items meeting certain search criteria 96 & 97 FIG. 7, and those items meeting certain criteria/categories 98: for visual items, the user can specify the types of items at different levels of view 80 FIG. 7.

(The user-sizable and user-moveable frame 71 FIG. 6 can follow the pointer 74, or can be moved independently. The frame can encompass the entire image area. See section 4.1 below.)

1.6.2 Primary Items

Once the range of available items is determined, the user can control which item (or items) is the primary item 100, 102 & 104 FIG. 7.

In use, there are three main ways that the user typically controls the primary item being presented 100, 102 & 104, and they can be used concurrently. They are:—

1) Pointer: The user can explore by freely moving a pointer/cursor 74 FIGS. 6 & 100 FIG. 7 (e.g. via mouse or touch) over the items in the area of the entity image (which can occupy the entire computer monitor area).

The system sets the item (according to the current level of view 93 FIG. 7) that the pointer is over at any time (represented by a basic item blob or a consolidated group item blob or blobs) as the primary item, and presents it (along with any secondary items).

Optionally the system can present an audio and/or tactile cue when the pointer crosses the border between two items.

At any moment in time the user can lock on the item being presented (see below).

(There can also be a mode which presents the underlying pixel color, with no blob consolidation performed.)

In addition to the spoken information, an optional pitched and panned buzzing sound can convey the location of the pointer within the image area, which, as reported in the referenced earlier patents, greatly improves the perception of shape and location (the speech is also pitched and panned, as described elsewhere).

When the pointer is moved around by the user, the item being presented can be interrupted as new items appear under the cursor, or alternatively once a description etc. has started to be presented then it continues until complete. Typically the user will prefer the system to interrupt, so that the current item is always being presented.

A useful feature is to optionally suppress the leading parts of the presented information. For example if the user is exploring the Dewey Decimal classification system FIG. 14, if the system keeps announcing the full description, the user may keep hearing the same leading material. For example if the words begin with the Division number, the heard words might be "Division 610" . . . "Division 6" . . . "Division" . . . "Division 640:Home . . . ". By suppressing the unchanged leading parts, the user will instead hear e.g. "Division 610" . . . "20" . . . "30" . . . "40:Home . . . " i.e. only hear the new material as they move over an area with items with common leading descriptions.

2) List or step: The user can command the system 102 FIG. 7 to automatically list/step around the qualifying items found 89. The system picks the most appropriate items given the current level of view 93 and other settings e.g. 80 FIG. 7, and this can depend on activity. The user can at any time lock on the item being presented.

3) Lock item: The user can at any time command the system 104 FIG. 7 to lock on the primary item currently being presented, whereupon that item remains the locked-on primary item until it the locked-on item is changed by the user via navigation commands etc., or the lock 104 is switched off.

1.6.3 Secondary Items

Secondary items are determined according to current control settings 75 to 78 FIG. 7 and can, for example, be items above and below the primary item in the levels of view 76, or items that were recently but are no longer primary items 77, etc.

1.7 Navigating with Locked-On Item(s)

The locked-on item and current primary item can be different e.g. when the locked-on item is a group item. When a group item is locked on, and the user moves the pointer within the area of the item, typically the items at lower-levels than the locked item are presented.

If a basic item is locked on, then that can be presented as the current primary item; but if a group item is locked on e.g. 173 FIG. 12, then optionally the system can make a child item 175 of the locked-on item 173 the current primary item, and allow stepping to other child items that comprise the locked-on item.

Once an item is locked on, the subsequent interaction depends to some extent on the equipment being used to access the entity.

1.7.1 Force-Feedback

If a force-feedback joystick 56 FIG. 4 or mouse 57 is being used, the system can restrict the free movement to the area(s) of the current primary item—when pushed by the user away from the item, a spring force will attempt to push the mouse or joystick handle back to the center or nearest part of the primary item (or to the point at which they left the blob). When within the area of the item, the mouse or joystick handle will be loose/"floppy" and can be moved freely. The user can feel around the edge of the item, and get audio feedback as well. Optionally the system can command the spring force to move the handle to the nearest part of the perimeter, so that it is locked to the perimeter of the locked-on primary item 103 FIG. 7. The user can then move the handle around the edge to explore the shape. (Alternatively the user can command the force-feedback device to perform an audiotactile tracer of the item's outline, with corners emphasized, as was previously available.)

The Logitech Wingman Force Feedback Mouse 57 FIG. 4 and Microsoft Sidewinder Force Feedback 2 joystick 56 are controlled via Microsoft's DirectInput methods.

Non-Contiguous Blobs

If the item is multi-blob, e.g. a group item with non-contiguous component basic items, then the user can command a jump to the next component blob, then explore its shape and content. Alternatively, with a force-feedback device the user can simply push the handle around the image and it will tend to snap the locked-on item to the nearest applicable blob. For example if "Faces" 141 FIG. 11 are locked on, the user can move the locked on face 134 simply by pushing the handle so that it snaps to the nearest face. (Alternatively the user can command the system to move the current primary item to the next face, as described in section 1.7.5 below.)

Contiguous Blobs

If applicable blobs (e.g. basic items that comprise the locked-on group item) are contiguous e.g. the countries 187 FIG. 13 shown within a locked-on island area 183, then simply snapping to the nearest applicable item will cause the locked item to keep changing as the mouse or joystick handle moves momentarily over the border 185 between two items e.g. countries 187.

Instead, the system can implement a policy that when the pointer is pushed beyond a certain distance over the border 185 into the adjacent item, or is about to cross the far edge of the adjacent (non-locked-on) item (whichever is closest) then the locked-on item snaps to that adjacent item. The effect may be that of being locked on an item, but when the user indicates determination to move to the adjacent item, then it snaps to it.

Alternatively the user can re-command the system to lock on the item that the pointer is currently over (rather than the one currently locked on) as they push the handle over the adjacent item.

One option is to have two levels of force—applying stronger restraining forces if the user is attempting to push the handle outside of the locked on item e.g. an island area 183 FIG. 13, and applying weaker restraining forces if the user is moving over an adjacent item that is an applicable component (e.g. country 187) of the locked-on parent group item (e.g. island 183).

1.7.2 Mouse

If a standard computer mouse is being used, an audio cue can signify and warn that the user has attempted to leave the area of the item. However the cursor/pointer can be locked at the edge of the item (via a Windows SetCursorPos action), so that the user does not need to find the item again and can simply move their mouse back in the opposite direction. In this way the user can gain an impression of the extent of the item (as well as from the other effects that may be presenting the item shape).

1.7.3 Touch

If a touch-screen tablet, or an absolute mode touch-pad 54 FIG. 4, is being used, then the system cannot easily restrict the physical movement of the user's finger, so needs to directly tell the user or give non-speech cues to indicate how to move back to the locked item area, or to the nearest content. However users will typically be better able to recall the approximate location of the item within the physical fixed area of the touch-screen or touch-pad, than when using a standard relative mode mouse.

1.7.4 Obtaining Shapes for Mouse and Touch Access

The user can get an immediate impression of the locations and shapes of the locked-on items or group items via sound by using a mouse or touch device to perform a drag following a coded tap or click sequence 115 FIG. 8 (described in section 1.9.2 below). This can command the system to move an audio and/or tactile shape tracer 48 & 31 FIG. 3 around the blob perimeter via one of the following approaches:— a) The audio tracer's position in its path around the perimeter of the item or items at any time can correspond to the distance of the drag from its start point. Hence by dragging back and forth the user can move the tracer correspondingly back and forth around the perimeter, and so get an impression of the shape, size and extent, and location, of the items. The system measures the distance from the initial vertical or horizontal location, so that the drag does not need to return to the exact start point.

b) The user can keep moving the tracer forwards around the perimeter by constantly moving the drag in any direction. They can reverse the drag direction to cause the tracer to reverse.

Both imprints 39 FIG. 3 and tracers 48 can be presented, and can move forwards or backwards, and present the current item, or all items in an item group. The type and combination of effects can be signified via combinations of:—the initial direction of drag (up, down, left, right, etc.); the screen quadrant or screen half that the drag starts in; and the direction of circular motion (clockwise or anticlockwise) of a rotational drag.

Additionally a mouse wheel, or dial 58 FIG. 4, can control the movement of the tracer, in a similar manner.

1.7.5 Navigating with Locked-On Items Via Commands

The locked-on item and current primary item can be different e.g. when the locked-on item is a group item (as described above).

The user will normally know which item is locked on (via an earlier announcement), and so can instead be told about the lower-level items that they are currently moving over, and that comprise the locked-on item. For example if they lock on the group item "Faces" 141 FIG. 11, the individual faces 134 can the items presented as primary items.

The system should allow the user to command the system to:— a) Lock on the primary item currently being presented.

b) Lock on any of the secondary items currently being presented.

c) Change the level of view, so that, for example, the primary items presented are the items below the currently locked-on item.

d) Move the primary item to the next item within the current locked-on group item.

e) Move the locked on item to the locked on item's parent item, being the item of which the current locked on item is a component i.e. move the lock up a level.

Many similar useful commands can be devised for navigating around an entity structure.

These commands can be performed using the methods described for commands generally e.g. keys, taps, gestures etc., though it has been found to be effective to use a mouse wheel or dial 58 FIG. 4 to move between items in different levels.

The items above and/or below the primary item being presented can also be presented at the same time via secondary multi-talker focus effects, so that the user can be aware of items in adjacent levels 76 FIG. 7 (or items nearby on the same level 75), and can switch to being locked on one of them. For example, if locked on a spreadsheet column 64 FIG. 5, the main voice can present the cell 62 being moved over, at the same time as which two of the secondary focus effect voices can present the column 64 and row 66 respectively in which the cell 62 is located (and optionally a third voice could present the block 68 containing the cell, column and row). As these extra voices are typically re-located at the corners of the audio display area 21, 23 & 24 FIG. 2, it is straightforward for the user to indicate which of these items to switch the lock to if required. Alternatively the system can add a number or letter to the spoken extra-voice content, so that the user can more easily know which item to select (not shown). This would typically be done where effect relocation 129 FIG. 10 is not performed 128, and so specific voices/talkers are less easy to identify.

The user can command the system to switch to any level of view above or below the current item; and if appropriate automatically step round the items below (or above, or adjacent to) the current item in the levels of view, as described above. They can then switch the locked item to be any of the listed items, so that directly pointing at particular items in the image is not required.

To summarize, the user can control the amount, and style, of their interaction with the system, with varying amounts of user input effort, ranging from low-input/less tiring automatic stepping round items, with imprints, shape-tracers etc.; to higher-input/more intensive pointer-based browsing, "locking" on and navigating around the items, and active shape exploration.

1.8 Multiple Properties and Item Types

In the visual domain, an image can be presented via several types of property, for example color, distance, texture, the nature of recognized items, etc., and the user can select which of these to present. However they might also wish to be aware of several property types and consolidations at the same time.

FIG. 13 shows an example of basic blobs (countries 187), which could be consolidated in two ways (as geographical islands 183, 188 & 189, and via political grouping 179). Similarly the cells of a spreadsheet FIG. 5 & FIG. 12 can be consolidated into columns 64, and/or rows 66, both of which are on the same level of view.

Some users may want to follow only one or two extra talker voices. One simple approach to presenting several different items, even if in separate entity viewpoints (e.g. visual, and spreadsheet), via a limited number of extra talkers 105 FIG. 7, is to command each talker to present several items, or properties, in sequence.

To resolve and simplify the presentation and navigation of multiple properties and classification/grouping methods, the following approach can be used:— i) In order that a client application can request presentation of more than one property type or item at the same time, the client can specify which extra voice should present each property or item when not being presented via the main voice, and so keep separate, if required, particular types of item. For the spreadsheet examples, the column details, and row details, can each be directed to separate voices e.g. via a field in the ItemKey file (not shown).

ii) The system can then inspect the various items to be presented, and direct selected items to particular extra voices, speaking them in sequence. Optionally the system can apply varying focus effects if required; and can temporarily alter the apparent position of the extra talkers.

iii) The user can navigate between items, properties, and entities, by selecting them when their corresponding words are spoken by the talkers. Alternatively the user can indicate the ordinal of the required item within a spoken list of items. With either method, that item then becomes the locked-on primary item.

In this way, the system can stream information to separate voice/speaker channels, allowing the user to be simultaneously aware of several entities, and related items and properties.

1.9 Interaction

Methods of interacting with the system have previously been described in the referenced and incorporated earlier patents for example using force feedback devices; and pen input, voice input, touch-screens, and touch-pads, as well as standard mouse and keyboard control, can also be used.

1.9.1 Ordered Control

One effective approach is to have up to 48 ordered control actions available via, for example, the numeric keys located along the top of a standard "QWERTY" keyboard, plus the two following keys (typically "–"/minus and "="/equals), totaling 12 keys. These 12 keys can be combined with two modifier keys, e.g. Control and Shift, giving a total of 48 possible command actions. Such an arrangement can also be operated via a numeric keypad, or via a touch- or mouse-operated on-screen grid ("OSG") FIG. 9, where the elements can be arranged 4×4 120, or arranged around the image area 121, with combinations of the lockable Ctrl- and Shift-keys 122 modifying the function of the 12 command keys. An "MMO" mouse with 12 extra programmable buttons (not shown) could also be used for this purpose.

1.9.2 Tapping and Gestures

One effective method of commanding the system is to tap Morse-like commands 114 FIG. 8 onto a touch-screen or touch-pad, or via mouse or joystick buttons i.e. combinations of short and long taps 118. The three possible modifier key combinations (Control, Shift, and Control+Shift 110) can be signified by the user doing a single long click or tap; a short then long click or tap; or two long clicks or taps; followed by up to 12 short taps for the appropriate 1 to 12 command.

This was found to be straightforward to perform, though if necessary an extra modifier key 111 FIG. 8 can be used to reduce the maximum number of short taps to six. Similarly a combination of short and long taps can precede a drag 115 & 119 across the touch-screen or touch-pad, for example to specify an area for tracking 116, a section of the image to zoom into 117, to pan a zoomed-in image 143 etc., and to perform the shape inspection described in section 1.7.4 above.

The same 48 ordered control actions 112 FIG. 8 can alternatively be triggered by tactile gestures 113: simple swipes in the direction of the hour markers of a standard clock face 101 can represent the numbers 1 to 12. An "Air Mouse" (not shown) could also be used for this purpose.

1.9.3 Touch Control

If a touch-screen tablet is being used (for example a Windows tablet), then the whole screen area 123 FIG. 9 can show the image being presented. The user can tap commands and drag over the computer monitor area, and touch the tablet screen to indicate parts of the image. On a particular command the image can be replaced with an array of command buttons for less-common instructions (not shown). Alternatively the screen can be split so that some of it is occupied by the image monitor 124 and some of it by the commanding on-screen grid 120.

Blind users can slide their finger over the on-screen grid (a process known as "scrubbing"), with speech feedback informing them of the key that they are over at any moment, so that they can navigate to the required command, whereupon they can raise their finger in order to select that command.

All of the above touch-based interaction methods were found to be effective to a degree, and a user can decide which approach is most appropriate for them, or they can use a combination of the methods.

1.9.4 Touch-Pad Control

A totally blind person is unable to benefit from seeing the OSG or the image being presented on a tablet computer's touch-screen 123 FIG. 9. Instead, a touch-pad 54 FIG. 4, as often found on laptop computers, may be used to control the system via taps and drags/swipes in the same manner as for a touch-screen. For example if a Synaptics™ TouchPad™ is available and set to absolute mode, it can be used to indicate locations within the Monitor and OSG, and to trigger touch-screen-style tap and gesture commands.

1.10 Online Data

The system can present data from the Internet 95 FIG. 7, for example mapping data that is available online. Additionally, online artificial intelligence (AI) systems may be used in order to perform more accurate object recognition etc. For example basic face and blob detection, and text and motion detection, can be provided standalone as described in section 1.3 above, yet when an Internet connection is available then more sophisticated processing can be provided—for example emotion detection is being developed, and could also be presented (not shown). IBM's™ Visual Recognition service can analyze a picture or video and return a list of words summarizing the visual material. Hewlett-Packard's™ IDOL APIs offer services such as image detection, face detection, entity extraction, and barcode reading.

Furthermore, online facilities exist to provide words summarizing the content of images, so providing a top-level (Level 1) summary term for visual images—for example Google's™ Image Recognition attempts to explain what is happening in images in common language.

SUMMARY

Multi-talker multi-level focus effects are a way for blind people and others to gain information about the content of a scene, and, when combined with multi-level representations of visual scenes (and other entities), and the previously reported methods, allow a blind person to access several aspects of visual images etc. The system allows managing of complexity and awareness of items, as well as providing for different levels of view of items in complex scenes.

2 HARDWARE & SOFTWARE

2.1 Hardware

Embodiments would typically be implemented via software running on a processor plus appropriate input and output peripherals, for example on a desktop computer 20 FIG. 2.

FIG. 4 shows the physical appearance of a low-cost preferred embodiment, which uses only standard hardware components (connecting cables not shown). The laptop computer 50 uses Microsoft's™ Windows™ operating system, on which the bespoke application software for the embodiment is running Visual representations can be provided by the webcam 53; from the inbuilt laptop DVD player 55; from files held on the computer 50; from the Internet 95 FIG. 7; or can be provided by the bespoke software. The force-feedback joystick 56, for example Microsoft's Sidewinder Force Feedback 2™, can be used by the user to indicate areas of the image and control the software, and by the system to lock to particular items (see section 1.7.1 above), (and can present Morse code-like impulses that can be felt and heard). The force-feedback mouse 57, for example Logitech's™ Wingman Force Feedback Mouse™, can be similarly used. If one-handed control is preferred then the tactile effects and user control functions can be combined on to one of the force-feedback devices. The laptop's internal loudspeakers output the audio effects. Alternatively separate loudspeakers or headphones 30 FIG. 2 can be used.

An embodiment of the system can be provided as a smartphone application (not shown). Certain smartphones and tablet-format portable computers have built-in video cameras and certain tactile control and feedback facilities, and are very portable, and so may be particularly suitable for embodying some or all of the features of the invention.

Specialized hardware can also be used, such as an array of tactile actuators 52 FIG. 4 (typically vibro-tactile or electro-tactile) acting on parts of the user's body, for example finger-read vibro-tactile arrays, tongue-placed electro-tactile displays, forehead electro-tactile displays, electromechanical tactile abdomen displays, etc.

An embodiment could be implemented via a very small processor embedded in or worn on the user's body, for example within the structure of the frame of a pair of spectacles, with a small video camera providing input images (not shown). (The spectacles may also provide additional optical enhancement, or be only used to provide support for the embodiment.)

The user interface can be in the form of a watch-like touch interface via a watch-like device worn on the user's wrist, combining both a touch-screen area and a 4×4 key area (not shown). Such a device may resemble a "calculator watch", allowing the user to control the system conveniently by touching the watch interface. The device could have a very small camera installed in it to provide images (not shown).

An embodiment of the system can be provided as an Internet service, or other remote service.

In the future embodiments of the system can be provided using future technologies.

The invention is not intended to be restricted to the embodiments described herein.

2.2 Software

Referenced and incorporated U.S. Pat. No. 8,239,032, UK Pat. No. GB2477431, and U.S. Pat. No. 8,239,032 describe approaches to developing the software, and similar approaches can be used for this invention. This description outlines the processes that are followed when the system is operating, and, when combined with U.S. Pat. No. 8,239,032, UK Pat. No. GB2477431, and U.S. Pat. No. 8,239,032, can be regarded as an outline functional specification of the software i.e. the software specification takes the form of a description of its function. The software functionality description is spread throughout this specification. The precise software design will depend on the processing hardware used and the preferred programming methods of the constructor. Software development is a large subject and well documented elsewhere, but the data and processing required are described in sufficient detail (when read in conjunction with U.S. Pat. No. 8,239,032, UK Pat. No. GB2477431, and U.S. Pat. No. 8,239,032) to enable software to be developed by people who are skilled in the art of software development, including its application to areas such as image processing, sound processing, speech synthesis, and man-machine interfacing.

The application software can be designed to be accessible to blind and deafblind people. Methods for doing this are widely documented elsewhere.

The user should be able to alter the parameters that control the software FIGS. 7 & 8. These can be optionally linked to particular activities so that the options and parameters appropriate for a particular activity can be rapidly selected. One convenient way of achieving this is to allow the user to either a) save all applicable user control settings; or b) save only the settings that the user changes during a period of time; and in either case link them to an activity. The first option a) will, on activity selection, restore all applicable controls to their saved values; while the second option b) will only update the controls that were changed during the period of time. The presentation arrangements can be persisted per entity type or viewpoint type, with a default arrangement being used for entities whose type is not recognized.

The system can be developed to run on a smartphone or tablet computer, or on any present or future computer formats that are appropriate.

A simple front-end interface can be provided, so that an appropriate level of functionality and complexity is exposed to the user.

Virtualization software can be used to run the system from a guest operating system run on a host operating system. For example the Wingman Force Feedback Mouse is unsupported and can be irregular in Windows Vista™ or later versions of Windows. In a test, the system was installed on a Windows 2000™ guest operating system using Oracle's™ VirtualBox™ on a 64-bit Windows 8 host computer, and the Wingman Force Feedback Mouse could then be used by the system. A similar approach can be used to allow the system to run on other families of operating systems, for example Linux or Apple™'s Mac™ OS. Furthermore the system could be run via online virtual services (not shown).

Section 3.7 of referenced and incorporated U.S. Pat. No. 9,430,954 describes a flexible scaleable system architecture.

If Microsoft DirectX sound is being used then, for example, DirectX Audio sound effect types echo and reverberation can be applied when presenting the effects. The DirectSound SetVolume, SetFrequency, and SetPosition or SetPan methods can be used to set the volume, height-conveying pitch, and stereophonic sound position respectively of the sound waveforms. Standard Windows PC Text-to-speech (TTS) output can be saved to a standard ".WAV"-format sound wave file, then pitched and panned as required, as described in section 1.3 above.

It was found to be practical to use 64 panned sound buffers for imprint effects, and several extra sound buffers can be used for focus effects—if pointer mode 100 FIG. 7 is active then the items at the focus of attention 125 FIG. 10, and the other presented items 126, can each use one (or more) buffers.

Several instances of the system can be used in a multi-processor environment in order to provide more system resources (see section 3.7 of referenced and incorporated U.S. Pat. No. 9,430,954).

3. DETAILED DESCRIPTION OF THE STEPS (FIG. 7 shows example computer UI controls for several of the features of the system. If a blind person is controlling the system then they should use suitable accessibility software to operate the controls, or use the command approach described in section 1.9 above.)

With reference to FIGS. 1, 2, and 7, the method and apparatus for presenting items comprises:—

1) Obtaining (or Obtaining Means for Obtaining) Items for Presentation.

This process is described in more detail in the referenced and incorporated earlier patents.

The items can be items found within visual representations 59 FIG. 7 such as live images 107, recorded still or moving images 108, created still or moving images 106, filtered still or moving images, still or moving images prepared by a person, maps FIG. 13, spreadsheets FIG. 12, descriptions of visual representations, visual representations produced by computer vision processing, data that can be presented visually, parts of computer desktops 109, visual representations provided by external systems 90, etc.; or can be components of non-visual entities such as classification systems FIG. 14, lists FIG. 15, books, documents, etc.

The items can be areas of particular ranges of colors shades 99 FIG. 7 and other properties, elements of data that can be presented visually, regular areas within the visual representation, areas of movement 83, identified objects, people's faces 82, text 84, components of the non-visual entities, etc.

The items can be derived from various sources 59 FIG. 7, and can be filtered and processed from a visual or special viewpoint 92 as described in section 1 above. For example the filtering can be i) items within the bounds of the Frame 94, ii) items whose description meets Search criteria 96 & 97, or iii) items meeting the Category filter settings 98 & 80—several of the filters can act at one time, and only those items meeting all of the requirements are selected. The resultant list of items 89 is typically sorted into order of importance, which can be based on various criteria such as size, declared importance (for prepared material), and can vary according to activity (not shown).

External systems may supply items to be presented via text and bitmap files as described in section 1 above—items may be deduced from a supplied "ItemKey", or from simple lists FIG. 15. A hybrid approach allows the meaning of components in a simple diagram to be presented, by using OCR to assign meaning to particular color FIG. 13, as described in section 1.5.4 above.

At least two items are required.

2) First Acquiring (or Acquiring Means for Acquiring) at Least One Primary Item.

This process is described in section 1 above. For example the primary item can be can the item under the pointer/cursor 100 FIG. 7, at a particular level of view 93, which can be presented on cursor movement (e.g. via mouse, touch, joystick, keyboard arrows, etc.) but remain un-presented when the cursor is stationary for more than a short time. In this way the user can freely explore the image, moving up and down levels of view 93 (for example via a Dial 58 FIG. 4, mouse wheel, or keyboard commands), and exploring the current level of view with the moving pointer.

Alternatively 102 FIG. 7 the primary item can be the next item 91 to be presented of a list of items 89 that are the result of the current filtering.

Alternatively 104 FIG. 7 the primary item can be the currently locked-on group item or can be a basic item within the currently locked-on group item etc., as described in Section 1.7 above.

If only one primary item is preferred, Pointer mode 100 FIG. 7 and Listing mode 102 can co-exist, with the listing continuing when the pointer stops moving, with Locked mode 104 overriding the other modes until it is toggled off.

Having these different modes available allows embodiments to be used according to the user's abilities and requirements. For example the listing mode, when combined with the navigation facilities, can be controlled via commands and may be used by a severely disabled person to explore the components of a viewpoint (e.g. visual image FIG. 11, or non-visual viewpoint such as classification systems FIG. 14, shopping lists FIG. 15, etc.).

There is typically one primary item selected for presentation at any moment, and this is straightforward for the user to follow. However it is possible to implement multiple primary items at any point in time, for example by using multiple pointers, or a multi-touch-point touch-screen, to indicate several items as primary items (not shown).

This specification mainly describes using a single primary item (also referred to as the "current item", or "item at the focus of attention"). However it is possible to apply the same approach to multiple simultaneous primary items, with appropriate modifications. For example the UI controls shown in FIG. 7 can be made to apply to each of the several primary items, and used to control the performance of each primary item (with appropriate modifications) (not shown).

At least one item must remain un-acquired.

3) Second Acquiring (or Acquiring Means for Acquiring) at Least One Secondary Item from Said Un-Acquired Items.

This process is described in section 1.6.3 above. The secondary items e.g. 126 FIG. 10 can be related or unrelated to the primary item 125. For example the secondary items can be items in levels of view above and below the location of the current primary item 76 FIG. 7, items closest to the primary item 75, items at the location of the primary item but within other viewpoints (not shown), items that were recently primary items but are no longer 77, item importance 78, etc.

4) Processing (or Processing Means for Processing) Each Primary Item into the Form of Categorically-Perceived Effects Representing the Primary Item, and Each Secondary Item into the Form of Categorically-Perceived Effects Representing the Secondary Item, Wherein the Effects Representing the Secondary Items Each Include Effects that are Categorically-Distinct from the Effects Representing the Primary Items. This process is described in section 1 above.

The categorically-perceived effects can be words of natural languages, phonemes of natural languages, coded phonemes of natural languages, other categorically-perceived sounds, coded tactile impulse sequences, braille-like effects, categorically-perceived vibrations, etc.

The categorically-distinct effects can be echo effects, reverberation effects, other audio special effects such as gargle, flange, etc., distinct voice character types, distinct audio relocations, added tone-like sounds, added humming sounds, added buzzing sounds, added tapping sounds, added bubble-like sounds, added raindrop-like sounds, distinct vibration effects, distinct tactile relocations, tactile effects on other force feedback devices, tactile effects on different parts of the user's body, etc.

The effects can be produced using the previously described methods, for example for speech-conveying tracer and imprint effects. If Microsoft DirectX sound is being used then, for example, DirectX Audio sound effect types echo and reverberation can be applied when presenting the effects. The DirectSound SetVolume, SetFrequency, and SetPosition or SetPan methods can be used to set the volume, height-conveying pitch, and stereophonic sound position respectively of the sound waveforms.

(Without optional Step 5 (below), there can be a sharp step-change effect, so that the emphasized items at the center of attention are clearly different in quality from non-emphasized items i.e. without a smooth increase in distorting/blurring effects with change, as described in section 1.1 above.)

5) Optionally Adding (or Adding Means for Adding) Property-Conveying Effects to the Secondary Item Effects. This process is described in section 1.1 above. The property values may be for example distance from the primary item, level of view distance from the primary item, time since (secondary) item was a primary item, item importance, etc. e.g. the magnitudes of the added property-conveying effects can be related to the difference in the particular property values ("focus property values") of the (secondary) de-emphasized items from the property value of the (primary) item(s) currently being emphasized.)

The added property-conveying effects 79 FIG. 7 can be volume, echo, reverberation, tone-like sounds, humming sounds, buzzing sounds, tapping sounds, bubble-like sounds, raindrop-like sounds, other audio effects, tactile effects, etc. If Microsoft DirectX sound is being used then, for example, DirectX Audio sound effect types echo and reverberation can be applied when presenting the effects. The DirectSound SetVolume, SetFrequency, and SetPosition or SetPan methods can be used to set the volume, height-conveying pitch, and stereophonic sound position respectively of the sound waveforms.

Doing this step allows the difference of the property values of the (secondary) items from the particular property values to be perceived via the varying property-conveying effects. When the property is "time since the secondary item was a primary item", an impression analogous to aspects of vision may be produced, enabling a better mental model of the several items to be formed.

6) Presenting (or Presenting Means for Presenting) the Effects.

The effects are typically simultaneously presented/output to the audio and/or tactile displays. The presenting/output apparatus can be audio 16 & 30 FIG. 2 and/or tactile 29 display apparatus suitable for presenting audio and/or tactile effects. The focus effects direct the user's attention to particular items, while at the same time making them aware of other co-located or separate items.

Hence users can have their focus of attention directed/drawn to things with particular properties that are emphasized, whilst they are simultaneously made aware of other things, which are not emphasized.

The presentation of the effects can be substantially delayed by a period of time, for example if the effects are recorded, then replayed later.

(Continue at Step 1—See FIG. 1.)

The obtaining, acquiring, processing, adding, and presenting, means described above, can include the hardware/software combination that causes the actions to occur, for example a computer sound card and the software that controls it, the software that causes tactile displays to exhibit the required effects, etc.

FIG. 2 conceptually illustrates the method and apparatus. The summary flowchart FIG. 1 is implemented by the processor 20 FIG. 2. The changeable UI "Scope" 11 & FIG. 6 can be moved and resized by the user to indicate a point defined by the "Pointer" 74 FIG. 6 and/or an area defined by the "Frame" 71 and/or an area defined by the "Inner Frame" 73. In the example shown in FIG. 2 there are three items to be presented, a distant (rounded) rectangle 10, a white square 12 at medium distance, and a nearby circle 14. The primary item is the white square 12. That item (the white square 12) is presented on the audio display 16 & 30 (and optionally on the tactile display 29), but the user can be simultaneously be made aware of the secondary items (circle 14 and rectangle 10), which are also presented, but with distorting focus effects such as voice character, echo, and reverberation. As an option, the system can artificially separate items 18 & 22 FIG. 2, as described in section 1.2 above. Similar relocations can be performed in the tactile modality 24 & 26 FIG. 2.

4. FEATURES 4.1 The "Scope"

The area within an image that is presented by effects can be user-controlled and can range from the entire area of the image, down to a single point within the image.

For example a special on-screen moveable and configurable UI feature 70 FIG. 6 (referred to as the Scope) containing a Pointer 74, an outer Frame 71, and an Inner Frame 74, can be used to indicate the point pointed to, and/or the regions selected respectively.

Means can be provided for changing the size and shape of the outer region on the fly so that a wider or narrower area is selected, or the shape of the outer region 71 can be changed, for example between rectangular and circular or oval (not shown). For example a diagonal mouse drag can indicate the requested location and size of the Scope (via the start and end of the drag showing e.g. the top left and bottom right range of the Scope). For blind users, audio or tactile cues can indicate the location and range of the Frame.

The frame can optionally be sized to fill the full area of the scene.

Typically the Pointer 74 FIG. 6 is locked to the center of the Frame 71, and the Frame and Pointer moved together. However they can optionally be unlocked, so that both are moved independently, or the Pointer can move freely within the area of the Frame (or up to near to the edges of the Frame), and then if the user moves further then the Frame is "dragged" along with the Pointer so that it still encloses the Pointer, so that the user can be sure that the Point is always within the Frame (not shown). At any point in time the user can command the Point to the center of the Frame, or the Frame to be relocated so that the current Pointer position is at its center (not shown).

There are two main modes of presenting items within an image using the scope 70 FIG. 6:— a) The user or the system can direct a Pointer 74 to a small point-like region or Inner Frame 73 within the area of a visual image (for example via a computer mouse, or via a touch-screen display), and the items at or near that point can then be presented via the effects.

b) Alternatively, the user or the system can direct a larger Frame 71 over a larger part of an image, or all of an image, and the most important items within the Frame can be presented by the system, e.g. sequentially stepping from item to item, listing the items by presenting them sequentially. Typically the audio effects will be pitched and binaurally located to match the location of the items being presented.

Both methods can be presented simultaneously, e.g. with the Pointer 74 presenting the items at the center of the Frame, and the listed important items within the Frame 71 also being presented. The user can be provided with methods of rapidly controlling which modes of presentation are used (pointer, stepping, or both) (see section 1.6.2 above).

As an option, the system can step sequentially through the co-located items 19 FIG. 2 below the Pointer.

The Pointer 74 FIG. 6 and Inner Frame 73; and Frame 71, are in some ways analogous to the fovea and macula of the human eye respectively—there is a region of high resolution (macula lutae) that is at the center of gaze. It is approximately oval in shape, and covers a field of view about 12 degrees wide and 4 degrees high. Within the macula there is a circular region of very high resolution (fovea centralis) that occupies about 1 degree of the field of view.

An additional use of the frame 71 FIG. 6 of the scope is to locate and size the prior art "Layouts" 42 FIG. 3, and this can happen on a particular command sequence being triggered.

4.2 Obtaining Related Items: Cascading and Linking 4.2.1 Cascading the Components of Basic Objects The system can "cascade/explode" basic items down to lower/finer details. For example if the system detects a person's face (as can be done reliably using computer vision), it can assume the presence of eyes, nose and mouth for a generic/standard face layout, and produce corresponding detail items for presentation i.e. eye, nose and mouth items whose location is based on the area occupied by the detected face, with cascaded properties such as distance. Similarly a bicycle can have its components cascaded down to e.g. frame, two wheels, etc., and then each wheel to tire, rim, spokes, etc. Generic structures such as these can be maintained in a simple object dictionary i.e. components file or database, and cascaded/exploded down on the fly. Links between such related components can be used to present the structures of such entities.

4.2.2 Links Between Items & Chains of Items

Referenced and incorporated U.S. Pat. No. 8,239,032 describes presenting objects and structures by linking components together and navigating/"walking" around them, and a similar approach can be used for the present invention.

Links between such components can be deduced automatically on the fly if the components are produced from an object dictionary. However for ItemKey items, the linkages are present either in the consolidation e.g. 160 FIG. 12 for parent-child relationships, where child sub-components can be linked to a single parent component; or in the case of linked but non-hierarchical relationships one or more other items on the same level can be linked simply by each item listing the component codes of the item(s) to which it is linked, in a similar manner (not shown). Chains of items can be formed by using two links for each item, and closed loops can form within structures.

Having identified the basic items within the scope of the Frame, or covered by the Point, the system can obtain related consolidated higher level items, and related lower level cascaded detail items, as described above, and add these to the set of candidate items for presentation.

4.3 Property and Effect Types

The properties that the focus effects present can for example be distance, or lateral distance, or classification level/level of view, or other properties. A value for any of these properties, referred to as the "focus property value", can be assigned for each item. The property emphasized and the emphasized level can be changed by the user on the fly (for example by using a mouse wheel).

Property types can be broadly classed as a) simple properties such as color, item type, distance, size etc.; and b) those properties that give the level of detail within a hierarchy of levels of detail.

4.3.1 Example Property Types

For example the properties can be:—

Distance 75 FIG. 7. Emphasizing items at particular distances may be thought of as in some ways analogous to the way that photographers use depth of field to accentuate the elements in the photograph they want the viewer to notice.

Lateral distance 75. i.e. "sideways" distance. Applying focus effects to lateral distances of items from the item at the focus of attention can make the user aware of nearby items, while also making clear which is the main (primary) item.

"Quiddity" (the "whatness" or essence of the item, i.e. that which a thing is, its substance). For example the system can temporarily emphasize a particular type of item e.g. people's faces, at the same time as it also presents other (secondary) items via de-emphasizing effects.

Importance 77. This can be dependent on the activity that the user is performing and, for example, can be decided by heuristic methods, or directly decided by a person preparing media for presentation.

Level of classification/level of view. This is described next.

Size, color, etc.

4.3.2 Level of Classification/Level of View

The "level of classification/level of view" allows the user to switch the way in which they observe things.

As well as directing the user's attention to conventional components in images, the focus effects can be used to direct attention to different levels of classification of the same overall entity, which can be classified in a number of levels, from basic items through to higher/wider levels of classification (i.e. group items).

For example in the case of general visual images FIG. 148 FIGS. 11 & 80 FIG. 7, the classification levels (from lower levels to higher levels) could be:—

Level 5 Items (e.g. individual basic blobs 133 of color and/or texture, or individual identified/recognized items 134 & 139).

Level 4 Categories 99 (e.g. groups of particular colors 140 "Reds" 81 etc., or recognized item types e.g. "Faces" 141 & 82 etc.).

Level 3 Types 85 (e.g. "spectral colors", or "earth colors", or "found items", or "supplied items" 142).

Level 2 Kinds 86 (e.g. areas of any picked colors or any identified item 144).

Level 1 Summary A summary level, containing one item 146, can present the whole thing being inspected e.g. image or spreadsheet.

Elements of abstract models and classification levels can be emphasized and de-emphasized in a similar manner. The following is a list of example physical and non-physical items that can be presented via focus effects, with elements listed going from wide view/high-level (group) items through to detailed/zoomed-in/low-level (basic) items:—

Levels of classification of a spreadsheet:—e.g. Cell block—Column or Row—Cell.

Dewey Decimal classification system (FIG. 14):—Class (e.g. 500/Science & Maths)—Division (e.g. 510/

Maths)—Section (e.g. 516/Geometry)—Sub-section (e.g. 516.3/Analytic Geometry).

The Bible:—Testament—Book—Chapter—Verse—Word.

People:—Crowd—Person—Head—Face—Nose—Nostril.

Political map:—State—Country—Region—County.

Linnaean classification:—Kingdom—Phylum—Class—Order—Family—Genus—Species.

4.3.3 Multiple Focus Properties

Typically a single property type will be used for determining the focus effects, but two or more property types could be used simultaneously. Different effect types should be used for each focus effect property. For example, the properties of "distance from user's point of view" and "lateral distance form Pointer" could both be presented via focus effects simultaneously, with echo effects applied to convey distance from user, and reverberation effects used to convey lateral distance.

4.3.4 Example Effect Types

The effect types that could be used to present a differentiating effect on items that are not the center of attention/not primary items include:

Effects such as Chorus, Compression, Distortion, Echo, Reverberation, Flange, Gargle, etc., Voice character e.g. male/female characteristics, accent etc., Pitch, Left-Right pan positioning, Timbre, Start time/time offset, and combinations of these. These effects are typically applied to the descriptive words that are presented. Echo, flange, and reverberation, and voice character, are particularly effective. Many other possible audio and tactile effects can also be used.

Tactile effects can be presented at a plurality of locations on the user's body, and different sets of items can be presented at each of the locations, whereby the user can more easily distinguish the sets of items.

Many other possible audio and tactile effects can also be used.

4.4 Other Features

The invention is not intended to be restricted to the embodiments described herein and may include the following features:— a) New input and control devices are frequently produced, and these can be assessed and used if appropriate.

b) The interface bitmap can be compressed, for example by using a separate JPEG image, and applying Run Length Encoding ("RLE") to the bit planes that mark-up the items.

c) Focus effects can be applied to imaginary scenes.

d) The system can use a "virtual reality" "360 degree" camera or similar means to gather images containing distributed items that surround the user, and corresponding effects can be located in 3D soundspace.

e) Two force feedback devices can be used, as shown 56 & 57 FIG. 4, and secondary effects can be identified by being presented on a different device to the one presenting primary items.

f) As the system can output both audio and tactile effects, users can spread the information load to suit their abilities and circumstances: they can choose which modality to use; or both modalities can be used simultaneously, allowing more information to be presented during a certain period of time.

g) An optional pitched and panned buzzing sound can convey the location of the pointer within the image area, as described in section 1.6.2 above. An additional tracer, of differing timbre, can convey distance information (if available) via pitch. Alternatively, the pitch of either the standard speech or standard buzzing sound can convey distance information, with the other conveying height. (A similar approach can be used for presenting distances for shape tracers and polytracers.)

h) The system may produce an impression analogous to that of "covert attention" in vision—several instances can each present separate locations i.e. the user can be simultaneously presented with information about several locations, whereby the effect known as covert attention is simulated.

5. GLOSSARY

Primary item: The item or items to which the users focus of attention is directed, for example the item under the pointer/cursor, or the item currently being presented from a list of items, or the currently locked-on basic item. Typically intended to be at the user's focus of attention.

Secondary items: Items also presented, but which are not the primary item(s). Secondary items are not intended to be at the user's focus of attention, but are presented so that the user is aware of them, and can be perceived by the listener with the primary item(s). The user can distinguish secondary items from the primary item(s) via categorically-distinct effects such as voice character and stereophonic location.

Basic item: Item that is directly marked as a blob on the bitmap, usually at the lowest level of view.

Group item: Consolidation of lower-level items such as basic items, and other lower level group items.

Categorically-distinct effects: Defined as being effects that are included in the effects applied only to secondary items, and which are clearly and perceptibly distinguishable from the effects applied to primary items, by being substantially different in nature, and not used for primary items. For example different types of voices (e.g. monotone, or with intonation), stereophonic location away from the primary item, and special effects such as echo and reverberation.

Categorically-perceived effects: Effects that tend to be perceived as being of one of a limited set of effects, for examples the phonemes of a language; braille cell patterns; impulse-code sequences; etc.

User: A human being using the embodiments.

Viewpoint: The domain of interest from which the items in the entity will be identified and extracted by the system i.e. the standpoint or perspective or domain view. For example standard visual viewpoint, or a special viewpoint for the domain of interest.

Auditory scene: an entity capable of being presented on an auditory display that includes information that a person can interpret. Typically stereophonic, sound scenes present audio representations of more than one item simultaneously.

Audio display: Device capable of communicating with human beings via the sense of hearing, for example a computer sound card and loudspeakers (and associated software).

Tactile display: Device capable of communicating with human beings via the sense of touch, for example a refreshable braille display, an "Optacon", a force-feedback joystick, etc. (and associated software).

Multi-talker: Pertaining to having several speech-like effects presented simultaneously, typically each representing an item to be presented.

6. CONCLUSIONS

Advantages

From the description above, a number of advantages of some embodiments of my system for presenting items become evident:

(a) Focus effects allow the user to have their focus of attention directed to items with particular properties that are emphasized, whilst they are at the same time made aware of items that are not emphasized. Optional property-conveying effects can be added.

(b) Facilities are provided for presenting and navigating multi-level representations of visual scenes and non-visual entities, interfacing to other systems, and interpreting entities from different viewpoints.

(c) Using standard bitmap and text files to interface with the system makes it straightforward to implement interfaces to other systems, and for users to create files for presenting.

(d) It can be used for numerous applications.

Conclusions, Ramifications, and Scope

Accordingly, the reader will see that the system addresses several of the shortcomings of previous inventions in the field. Furthermore, the system has the additional advantage that embodiments can be implemented using low-cost standard computer hardware.

Although the description above contains many specificities, these should not be construed as limiting the scope of the embodiments but as merely providing illustrations of some of the presently preferred embodiments. Numerous modifications may be made to the arrangements that have been described without departing from the true spirit and scope of the invention Thus the scope of the embodiments should be determined by the appended claims and their legal equivalents, rather than by the examples given.

I claim:

1. A method of presenting items via speech-like sounds comprising:
   (a) providing processing means;
   (b) obtaining a plurality of items;
   (c) first acquiring at least one primary item from said plurality of items wherein at least one of said plurality of items remains un-acquired;
   (d) second acquiring at least one secondary item from said un-acquired items;
   (e) first processing via said processing means each said primary item into the form of speech-like sounds representing said primary item;
   (f) second processing via said processing means each said secondary item into the form of speech-like sounds representing said secondary item, wherein said speech-like sounds representing secondary items include effects which are categorically-distinct from any effects applied to said speech-like sounds representing primary items;
   (g) presenting said speech-like sounds to at least one audio display means;
   whereby user can have their focus of attention directed to said primary items, and can simultaneously be made aware of said secondary items, and can distinguish said secondary items from said primary items via said categorically-distinct effects.

2. A method according to claim 1 wherein said speech-like sounds include sounds selected from the group consisting of: words of natural languages, phonemes of natural languages, other categorically-perceived sounds, and combinations thereof; and wherein said categorically-distinct effects include effects selected from the group consisting of: echo effects, reverberation effects, flange effects, gargle effects, other audio special effects, added tone-like sounds, added humming sounds, added buzzing sounds, added tapping sounds, added bubble-like sounds, added raindrop-like sounds, distinct types of voice, distinct audio relocations, and combinations thereof.

3. A method according to claim 1 further including the step of:
   (a) adding property-conveying effects to said speech-like sounds representing secondary items, wherein the magnitudes of said added property-conveying effects are related to particular property values;
   wherein said particular property values include particular property values selected from the group consisting of: distance from said primary item, level of view distance from said primary item, time since item was a primary item, item importance, other property values, and combinations thereof;
   and wherein said added property-conveying effects include effects selected from the group consisting of: volume, echo, reverberation, flange, gargle, humming sounds, buzzing sounds, tapping sounds, bubble-like sounds, raindrop-like sounds, stereophonic location, other audio effects, and combinations thereof;
   whereby said particular property values of said secondary items can be perceived via said varying added property-conveying effects.

4. A method according to claim 1 wherein said plurality of items is obtained according to item obtaining criteria which include obtaining criteria selected from the group consisting of:
   entity source, level of view, viewpoint, within a frame, category filter, search filter, other obtaining criteria, and combinations thereof;
   and wherein said primary items are acquired via primary item acquiring criteria which include acquiring criteria selected from the group consisting of: being at a pointer location, being current item in a list of items, locked on items, other acquiring criteria, and combinations thereof;
   and wherein said secondary items are acquired via secondary item acquiring criteria which include acquiring criteria selected from the group consisting of: items in levels of view above and below the location of current said primary item, items closest to said primary item, items at the location of said primary item but within other viewpoints, other acquiring criteria related to said primary item, items that were recently primary items but are no longer, item importance, other acquiring criteria not related to current said primary items, and combinations thereof.

5. A method according to claim 1 wherein said speech-like sounds representing said at least one primary item include stereophonic sounds for which the pitch and horizontal stereophonic positioning relates to the vertical and horizontal location respectively of said at least one primary item;
   and wherein said effects representing said at least one secondary item include stereophonic sounds for which the pitch and horizontal stereophonic positioning relates to locations that are substantially separated from the locations of said at least one primary item;
   whereby the apparent locations of said at least one primary item can be perceived via said stereophonic sounds, and said at least one primary item can be clearly distinguished from said secondary items which have been relocated away from said at least one primary item.

6. A method according to claim 1 which provides means of navigating between said items, wherein said means of navigating include means of navigating selected from the group consisting of: means of navigating between items on the same level of view, means of navigating by selecting items as they are presented, means of navigating between items that are all consolidated into a particular item, means of navigating between items in differing levels of multi-level representations, other navigating means, and combinations thereof;
    and wherein said navigation is controlled via control means selected from the group consisting of: keyboards, computer mice, force feedback joysticks, force feedback mice, touch-screens, touch-pads, morse code-like taps to touch-screens or touch-pads or buttons, voice input, pen input, other control means, and combinations thereof;
    whereby users can control what is presented.

7. A method according to claim 1 wherein additional effect types are presented with said speech-like sounds, wherein said additional effect types include additional effect types selected from the group consisting of: tracer effects, polytracer effects, imprint effects, other additional effect types, and combinations thereof;
    whereby the shapes, properties, locations, and extents, of said presented items can be more accurately perceived.

8. A method according to claim 1 in which said plurality of items includes items selected from the group consisting of: items obtained from visual representations, items obtained from non-visual entities, and combinations thereof;
    wherein said visual representations include visual representations selected from the group consisting of: live images, recorded still or moving images, created still or moving images, filtered still or moving images, still or moving images prepared by a person, maps, spreadsheets, descriptions of visual representations, visual representations produced by computer vision processing, data that can be presented visually, parts of computer desktops, visual representations provided by external systems, other non-visual representations, and combinations thereof;
    and wherein said non-visual entities include non-visual entities selected from the group consisting of: classification systems, lists, books, documents, other non-visual entities, and combinations thereof;
    and wherein said items include items selected from the group consisting of: areas of particular ranges of colors shades and other properties, elements of data that can be presented visually, regular areas within said visual representation, areas of movement, identified objects, people's faces, text, components of said non-visual entities, group item consolidations of basic items, other items, and combinations thereof.

9. A method according to claim 1 which includes features selected from the group consisting of:
    means of converting non-visual entities into two-dimensional visual representations whereby said non-visual entities can be presented,
    means of presenting said effects to said audio and tactile display means at substantially later points in time,
    means of interfacing with other systems whereby said other systems can cause items to be presented from said other system's domain viewpoints,
    and combinations thereof.

10. A method according to claim 1 which is provided as an Internet service.

11. Apparatus enabling people to perceive items via speech-like sounds comprising:
    (a) obtaining means for a obtaining a plurality of items;
    (b) first acquiring means for acquiring at least one primary item from said plurality of items wherein at least one of said plurality of items remains un-acquired;
    (c) second acquiring means for acquiring at least one secondary item from said un-acquired items;
    (d) processing means for processing each said primary item into the form of speech-like sounds representing said primary item, and processing each said secondary item into the form of speech-like sounds representing said secondary item, wherein said speech-like sounds representing secondary items include effects which are categorically-distinct and which are not applied to any of said speech-like sounds representing primary items;
    (e) presenting means for presenting said speech-like sounds to at least one audio display means;
    whereby user can have their focus of attention directed to said primary items, and can simultaneously be made aware of said secondary items, and can distinguish said secondary items from said primary items via said categorically-distinct effects.

12. Apparatus according to claim 11 wherein said speech-like sounds include sounds selected from the group consisting of: words of natural languages, phonemes of natural languages, other categorically-perceived sounds, and combinations thereof;
    and wherein said categorically-distinct effects include effects selected from the group consisting of: echo effects, reverberation effects, flange effects, gargle effects, other audio special effects, added tone-like sounds, added humming sounds, added buzzing sounds, added tapping sounds, added bubble-like sounds, added raindrop-like sounds, distinct types of voice, distinct audio relocations, and combinations thereof.

13. Apparatus according to claim 11 further comprising:
    (a) adding means for adding property-conveying effects to said speech-like sounds representing secondary items, wherein the magnitudes of said added property-conveying effects are related to particular property values;
    wherein said particular property values include particular property values selected from the group consisting of: distance from said primary item, level of view distance from said primary item, time since item was a primary item, item importance, other property values, and combinations thereof;
    and wherein said added property-conveying effects include effects selected from the group consisting of: volume, echo, reverberation, flange, gargle, humming sounds, buzzing sounds, tapping sounds, bubble-like sounds, raindrop-like sounds, stereophonic location, other audio effects, and combinations thereof;
    whereby said particular property values of said secondary items can be perceived via said varying added property-conveying effects.

14. Apparatus according to claim 11 wherein said plurality of items is obtained according to item obtaining criteria which include obtaining criteria selected from the group consisting of:
entity source, level of view, viewpoint, within a frame, category filter, search filter, other obtaining criteria, and combinations thereof;
    and wherein said primary items are acquired via primary item acquiring criteria which include acquiring criteria selected from the group consisting of: being at a pointer location, being current item in a list of items, locked on items, other acquiring criteria, and combinations thereof;

and wherein said secondary items are acquired via secondary item acquiring criteria which include acquiring criteria selected from the group consisting of: items in levels of view above and below the location of current said primary item, items closest to said primary item, items at the location of said primary item but within other viewpoints, other acquiring criteria related to said primary item, items that were recently primary items but are no longer, item importance, other acquiring criteria not related to current said primary items, and combinations thereof.

15. Apparatus according to claim 11 wherein said speech-like sounds representing said at least one primary item include stereophonic sounds for which the pitch and horizontal stereophonic positioning relates to the vertical and horizontal location respectively of said at least one primary item;

and wherein said effects representing said at least one secondary item include stereophonic sounds for which the pitch and horizontal stereophonic positioning relates to locations that are substantially separated from the locations of said at least one primary item;

whereby the apparent locations of said at least one primary item can be perceived via said stereophonic sounds, and said at least one primary item can be clearly distinguished from said secondary items which have been relocated away from said at least one primary item.

16. Apparatus according to claim 11 which provides means of navigating between said items, wherein said means of navigating include means of navigating selected from the group consisting of: means of navigating between items on the same level of view, means of navigating by selecting items as they are presented, means of navigating between items that are all consolidated into a particular item, means of navigating between items in differing levels of multi-level representations, other navigating means, and combinations thereof;

and wherein said navigation is controlled via control means selected from the group consisting of: keyboards, computer mice, force feedback joysticks, force feedback mice, touch-screens, touch-pads, morse code-like taps to touch-screens or touch-pads or buttons, voice input, pen input, other control means, and combinations thereof;

whereby users can control what is presented.

17. Apparatus according to claim 11 wherein additional effect types are presented with said speech-like sounds, wherein said additional effect types include additional effect types selected from the group consisting of: tracer effects, polytracer effects, imprint effects, other additional effect types, and combinations thereof;

whereby the shapes, properties, locations, and extents, of said presented items can be more accurately perceived.

18. Apparatus according to claim 11 in which said plurality of items includes items selected from the group consisting of: items obtained from visual representations, items obtained from non-visual entities, and combinations thereof;

wherein said visual representations include visual representations selected from the group consisting of: live images, recorded still or moving images, created still or moving images, filtered still or moving images, still or moving images prepared by a person, maps, spreadsheets, descriptions of visual representations, visual representations produced by computer vision processing, data that can be presented visually, parts of computer desktops, visual representations provided by external systems, other non-visual representations, and combinations thereof;

and wherein said non-visual entities include non-visual entities selected from the group consisting of: classification systems, lists, books, documents, other non-visual entities, and combinations thereof;

and wherein said items include items selected from the group consisting of: areas of particular ranges of colors shades and other properties, elements of data that can be presented visually, regular areas within said visual representation, areas of movement, identified objects, people's faces, text, components of said non-visual entities, group item consolidations of basic items, other items, and combinations thereof.

19. Apparatus according to claim 11 which includes features selected from the group consisting of:

means of converting non-visual entities into two-dimensional visual representations whereby said non-visual entities can be presented, means of presenting said effects to said audio and tactile display means at substantially later points in time, means of interfacing with other systems whereby said other systems can cause items to be presented from said other system's domain viewpoints, and combinations thereof.

20. Apparatus according to claim 11 which is implemented in the form of at least one computer format, wherein said computer formats includes computer formats selected from the group consisting of: desktop computer formats, portable computer formats, smartphone computer formats, watch-like computer formats, body-worn computer formats, other computer formats, and combinations thereof.

* * * * *